United States Patent
Reiners et al.

(10) Patent No.: US 11,788,563 B2
(45) Date of Patent: Oct. 17, 2023

(54) ACCUMULATOR PRE-CHARGE MONITORING USING POSITION SENSOR

(71) Applicant: DEERE & COMPANY, Moline, IL (US)

(72) Inventors: Alexander C. Reiners, Thibodaux, LA (US); John A. Dighton, Thibodaux, LA (US); Peter A. Johnson, Thibodaux, LA (US)

(73) Assignee: Deere & Company, Moline, IL (US)

(*) Notice: Subject to any disclaimer, the term of this patent is extended or adjusted under 35 U.S.C. 154(b) by 200 days.

(21) Appl. No.: 17/127,277

(22) Filed: Dec. 18, 2020

(65) Prior Publication Data

US 2021/0332836 A1 Oct. 28, 2021

Related U.S. Application Data

(60) Provisional application No. 63/014,784, filed on Apr. 24, 2020.

(51) Int. Cl.
| | | |
|---|---|---|
| *F15B 19/00* | (2006.01) | |
| *F15B 1/08* | (2006.01) | |
| *E02F 9/22* | (2006.01) | |

(52) U.S. Cl.
CPC ............ *F15B 19/00* (2013.01); *E02F 9/2257* (2013.01); *F15B 1/08* (2013.01); *F15B 2211/857* (2013.01)

(58) Field of Classification Search
CPC ....... F15B 19/00; F15B 1/08; F15B 2211/857
See application file for complete search history.

(56) References Cited

U.S. PATENT DOCUMENTS

| | | | | |
|---|---|---|---|---|
| 5,624,105 A | * | 4/1997 | Runkel | F15B 1/24 |
| | | | | 267/64.15 |
| 2003/0115863 A1 | * | 6/2003 | Holt | F16D 31/00 |
| | | | | 60/414 |
| 2014/0060030 A1 | * | 3/2014 | Ma | E02F 9/123 |
| | | | | 60/413 |
| 2015/0000756 A1 | | 1/2015 | Chen et al. | |
| 2015/0097417 A1 | * | 4/2015 | Thompson | B60T 13/686 |
| | | | | 303/10 |

OTHER PUBLICATIONS

Bauer, Wolfgang. Hydropneumatic suspension systems. Berlin: Springer, 2011. (Year: 2011).*
Hydraulic System—CH570 & CH670 Sugar Cane Harvester, Mar. 15, 2016, pp. 2599-2610.

* cited by examiner

*Primary Examiner* — Kristina M Deherrera
*Assistant Examiner* — Fatemeh Esfandiari Nia

(57) ABSTRACT

Systems and methods for determining a pre-charge gas pressure in a gas-charged hydraulic accumulator are disclosed. For example, systems and methods for determining pre-charged gas pressure of a gas-charged hydraulic accumulator included as part of a vehicle are disclosed. Further, the present disclosure provides for determining a pre-charge gas pressure of a gas-charged hydraulic accumulator using a position sensor. The accumulator may form part of a hydraulic system used to move one part of the vehicle relative to another.

22 Claims, 9 Drawing Sheets

FIG. 10

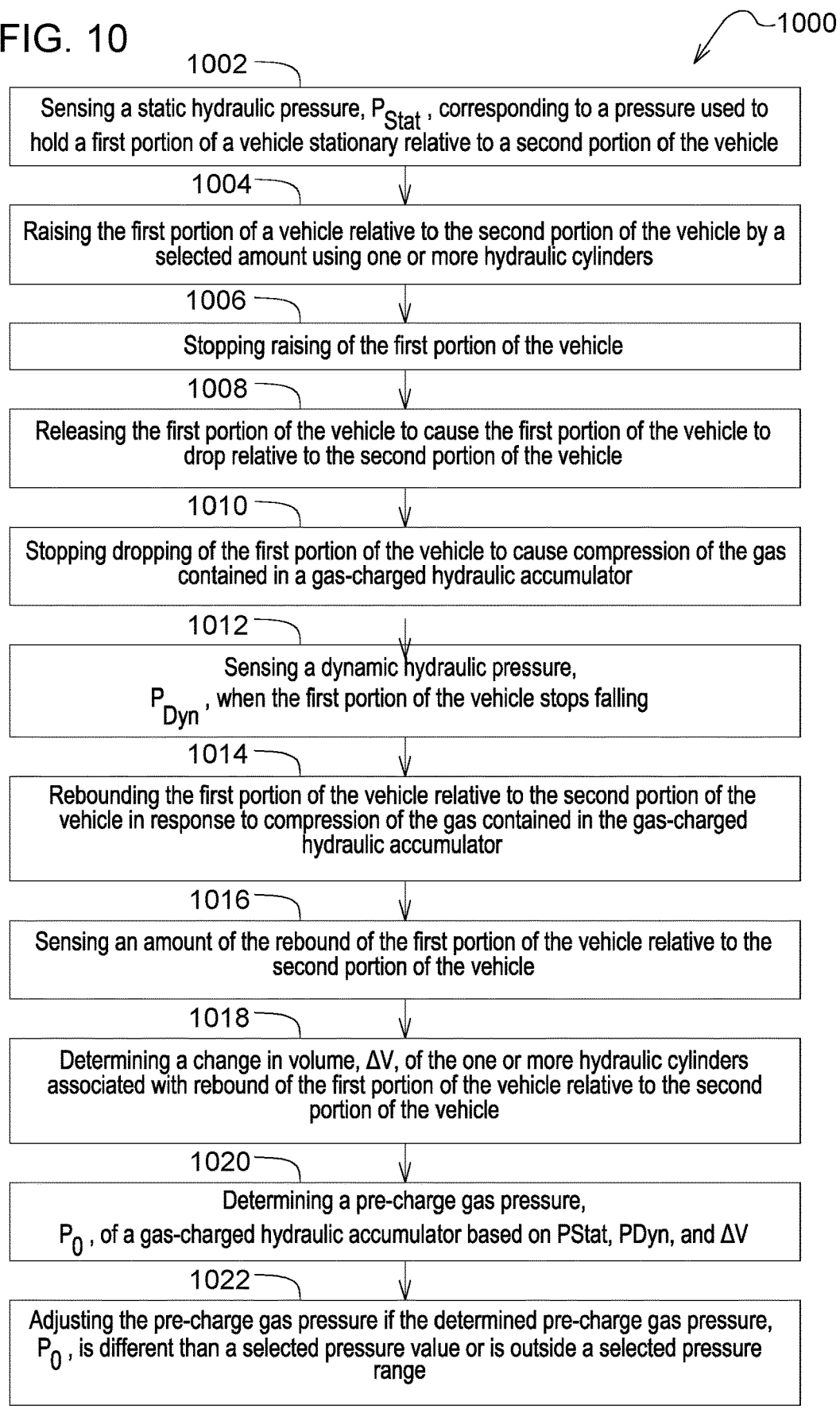

1002 — Sensing a static hydraulic pressure, $P_{Stat}$, corresponding to a pressure used to hold a first portion of a vehicle stationary relative to a second portion of the vehicle 1004 — Raising the first portion of a vehicle relative to the second portion of the vehicle by a selected amount using one or more hydraulic cylinders 1006 — Stopping raising of the first portion of the vehicle 1008 — Releasing the first portion of the vehicle to cause the first portion of the vehicle to drop relative to the second portion of the vehicle 1010 — Stopping dropping of the first portion of the vehicle to cause compression of the gas contained in a gas-charged hydraulic accumulator 1012 — Sensing a dynamic hydraulic pressure, $P_{Dyn}$, when the first portion of the vehicle stops falling 1014 — Rebounding the first portion of the vehicle relative to the second portion of the vehicle in response to compression of the gas contained in the gas-charged hydraulic accumulator 1016 — Sensing an amount of the rebound of the first portion of the vehicle relative to the second portion of the vehicle 1018 — Determining a change in volume, $\Delta V$, of the one or more hydraulic cylinders associated with rebound of the first portion of the vehicle relative to the second portion of the vehicle 1020 — Determining a pre-charge gas pressure, $P_0$, of a gas-charged hydraulic accumulator based on $P_{Stat}$, $P_{Dyn}$, and $\Delta V$ 1022 — Adjusting the pre-charge gas pressure if the determined pre-charge gas pressure, $P_0$, is different than a selected pressure value or is outside a selected pressure range

ACCUMULATOR PRE-CHARGE MONITORING USING POSITION SENSOR

CROSS-REFERENCE TO RELATED APPLICATIONS

This application claims the benefit of U.S. Provisional Application No. 63/014,784, filed Apr. 24, 2020, the entire contents of which are incorporated herein by reference.

FIELD OF THE DISCLOSURE

The present disclosure relates generally to hydraulic systems, particularly to hydraulic systems for industrial vehicles.

BACKGROUND OF THE DISCLOSURE

Industrial vehicles, such as agricultural vehicles, include accumulators, such as hydraulic accumulators, to maintain a position of a portion of the vehicle relative to another when hydraulic fluid pressure reduces, such as when hydraulic fluid pressure reduces unexpectedly.

SUMMARY OF THE DISCLOSURE

A first aspect of the present disclosure is directed to method for detecting a pressure condition of a gas-charged hydraulic accumulator. The method may include lifting a first portion of a vehicle relative to a second portion of the vehicle to a selected height with hydraulic fluid at pressure in excess of a first pressure; releasing the hydraulic pressure in excess of the first pressure to cause the first portion of the vehicle to fall relative to the second portion of the vehicle; establishing the hydraulic fluid at the first pressure when the first portion has fallen by a selected amount; compressing a gas within a gas-charged hydraulic accumulator with the hydraulic fluid at the first pressure; causing the first portion of the vehicle to rebound relative to the second portion of the vehicle in response to compression of the gas within the gas-charged hydraulic accumulator; and determining a pre-charge gas pressure in the gas-charged hydraulic accumulator in response to the rebound of the first portion of the vehicle relative to the second portion of the vehicle, the pre-charge gas pressure being a gas pressure within the gas-charged hydraulic accumulator in the absence hydraulic pressure.

Another aspect of the present disclosure is directed to a method for detecting a pressure condition in a gas-charged hydraulic accumulator for a vehicle. The method may include lifting, with a first hydraulic pressure greater than a selected hydraulic pressure, a first portion of the vehicle relative to a second portion of the vehicle to a selected height, the first portion of the vehicle coupled to the second portion of the vehicle; lowering, with a second hydraulic pressure greater than the selected hydraulic pressure, the first portion of the vehicle relative to the second portion of the vehicle; stopping the lowering of a first portion of the vehicle relative to the second portion when the first portion has been lowered by a selected amount; rebounding the first portion of the vehicle relative to the second portion of the vehicle with a gas-charged hydraulic actuator; sensing an amount of rebound of the first portion of the vehicle relative to the second portion; and determining a pre-charge gas pressure within the gas-charged hydraulic accumulator using the amount of rebound of the first portion of the vehicle relative to the second portion of the vehicle, the pre-charge gas pressure being a gas pressure within the gas-charged hydraulic accumulator in the absence of applied hydraulic pressure.

Another aspect of the present disclosure is directed to a computer-implemented system for determining a pre-charge gas pressure in a gas-charged hydraulic accumulator. The system may include one or more processors and a non-transitory computer-readable storage medium coupled to the one or more processors and storing programming instructions for execution by the one or more processors, the programming instructions instructing the one or more processors to: lift a first portion of a vehicle relative to a second portion of the vehicle to a selected height with hydraulic fluid at pressure in excess of a first pressure; release the hydraulic pressure in excess of the first pressure to cause the first portion of the vehicle to fall relative to the second portion of the vehicle; establish the hydraulic fluid at the first pressure when the first portion has fallen by a selected amount; detect an amount of rebound of the first portion of the vehicle relative to the second portion as a result of compression of a gas within the gas-charged hydraulic accumulator in response to the hydraulic fluid established at the first pressure; and determine a pre-charge gas pressure in the gas-charged hydraulic accumulator based on the detected amount of rebound of the first portion of the vehicle relative to the second portion of the vehicle, the pre-charge gas pressure being a gas pressure within the gas-charged hydraulic accumulator in the absence of applied hydraulic pressure.

Other features and aspects will become apparent by consideration of the detailed description and accompanying drawings.

BRIEF DESCRIPTION OF THE DRAWINGS

The detailed description of the drawings refers to the accompanying figures in which:

FIG. 10 is a flow chart of another example method of determining the pre-charged gas pressure, according to some implementations of the present disclosure.

DETAILED DESCRIPTION

Figure 1:
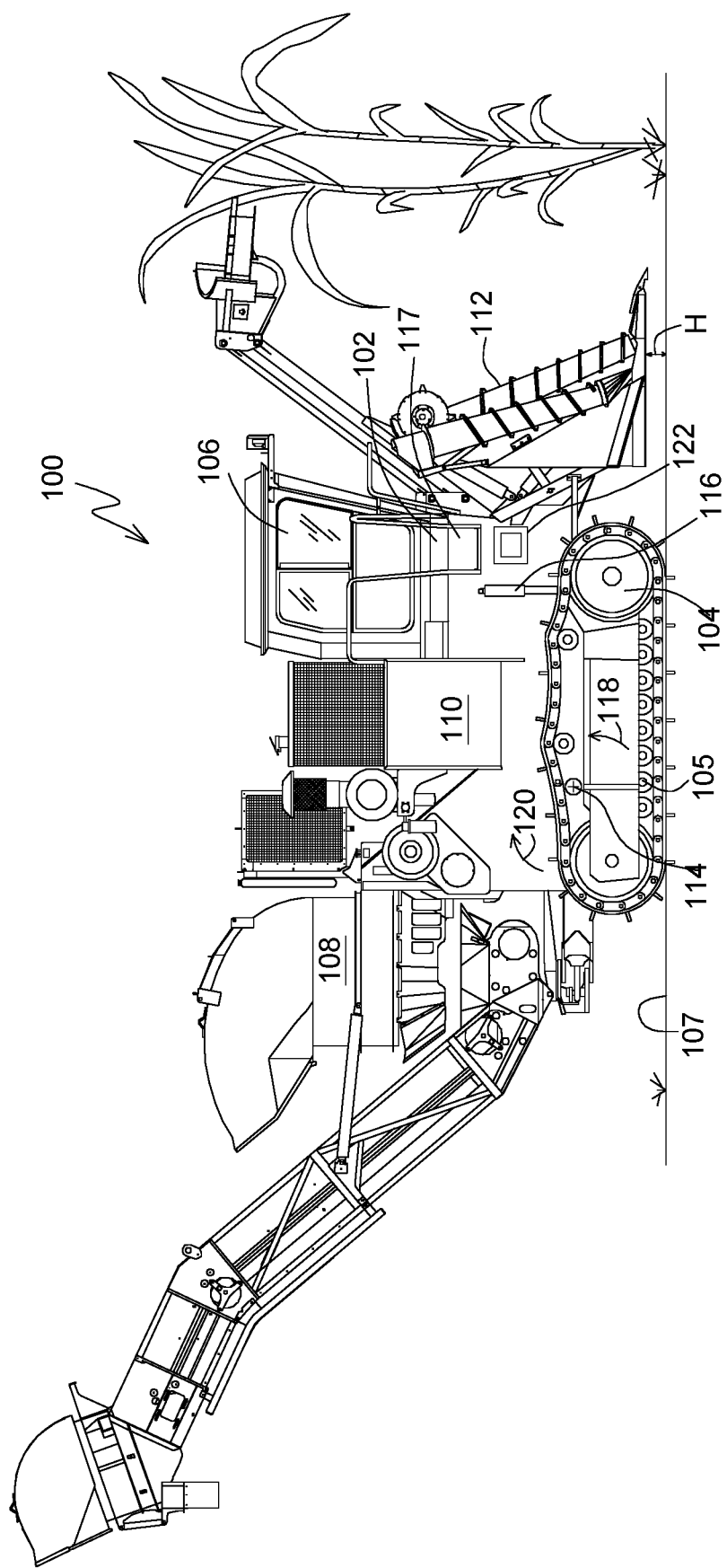
FIG. 1 is a side view of an example vehicle, according to some implementations of the present disclosure.

For the purposes of promoting an understanding of the principles of the present disclosure, reference will now be made to the implementations illustrated in the drawings, and specific language will be used to describe the same. It will nevertheless be understood that no limitation of the scope of the disclosure is intended. Any alterations and further modifications to the described devices, instruments, methods, and any further application of the principles of the present disclosure are fully contemplated as would normally occur to one skilled in the art to which the disclosure relates. In particular, it is fully contemplated that the features, components, and/or steps described with respect to one implementation may be combined with the features, components, and/or steps described with respect to other implementations of the present disclosure.

The present disclosure is directed to systems and methods for determining a pre-charge gas pressure within gas-charged hydraulic accumulators. The gas-charged hydraulic accumulators may be included, for example, as part of a vehicle lift system or as an implement (e.g., a header) lift system. The gas contained in the gas-charged hydraulic accumulator may be a single gas or a mixture of gases. The systems and methods within the scope of the present disclosure utilize system properties of a hydraulic system to determine a pre-charge gas pressure of the gas-charged hydraulic accumulator. The hydraulic system is viewed as a hydraulic suspension system, and the hydraulic system properties, along with system performance measurements, are used to determine the pre-charge gas pressure within the accumulator and determine whether the pre-charge gas pressure is at a selected level.

FIG. 1 is a side view of an example vehicle 100 within the scope of the present disclosure. Particularly, the vehicle 100 is a sugarcane harvester. However, other types of vehicles, including other types of agricultural vehicles, construction vehicles, and forestry vehicles are also within the scope of the present disclosure.

The vehicle 100 includes a body portion 102 that is coupled to a frame portion 104. The body portion 102 includes an operator cab 106, crop processing equipment 108, and a power plant 110. An implement 112, such as a crop head, is coupled to the body portion 102. The frame portion 104 includes a drive system 105, and the drive system 105 may include one or more wheels or tracks that are used move the vehicle 100 along a surface 107. The surface 107 may be the ground, a road, or other surface along which the vehicle 100 travels.

The body portion 102 and the frame portion 104 are pivotably coupled to each other along a pivoting axis 114. Hydraulic cylinders 116, one on each side of the vehicle 100, operate to pivot the body portion 102 relative to the frame portion 104 by raising and lowering a leading end 117 of the body portion 102. Hydraulic cylinders 116, such as hydraulic cylinders 116, are example actuators within the scope of the present disclosure. For example, extension of the hydraulic cylinders 116 raises the body portion 102, pivoting the body portion 102 in a first direction 118 about the pivoting axis 114, and retracting the hydraulic cylinders 116 lowers the body portion 102, pivoting the body portion 102 about the pivoting axis 114 in a second direction 120, opposite the first direction 118. Although two hydraulic cylinders 116 are described, other implementations may include fewer or additional hydraulic cylinders. Moving the body portion 102 in this way relative to the frame portion 104 may be performed to affect a height H of the implement 112 relative to the surface 107 or to alter a clearance of the body portion 102, particularly the leading end 117 of the body portion 102, relative to the surface 107.

The vehicle 100 also includes an accumulator 122 that is in fluidic communication with the hydraulic cylinders 116. The accumulator 122 and the hydraulic cylinders 116 form part of a hydraulic system of the vehicle 100, which may be similar to hydraulic system 200, described in more detail below. The accumulator 122 is a gas-charged hydraulic accumulator that operates as an energy storage device. For example, the accumulator 122 operates to store energy by compressing a gas with hydraulic pressure. The stored energy in the form of compressed gas may be applied to the hydraulic fluid in instances where hydraulic pressure reduces, such as during a loss or reduction in power of the vehicle. The compressed gas applies pressure to the hydraulic fluid, for example, during reductions in hydraulic pressure. The accumulator 122 compresses in response to movement, e.g., acceleration, of the body portion 102 (which represents a suspended mass) relative to the frame portion 104. Thus, the body portion 102 and the accumulator 122 form a mass-spring-damper system in which the body portion 102 represents the mass and the accumulator 122 represents a spring and damper combination.

Further, as a result of the spring nature of a gas-charged hydraulic accumulator, the accumulator 122 may be used as a suspension component to isolate the body portion 102 of the vehicle 100 as the vehicle 100 moves across a surface, such as the ground. In the context of suspension, as the vehicle 100 moves over an uneven surface, the hydraulic cylinders 116 will extend and retract as a result of relative movement of the body portion 102 relative to the frame portion 104 due to bumps or irregularities in the surface. These changes in elevation of the surface result in acceleration of the body portion relative 102 to the frame portion 104 as the vehicle 100 moves over the surface. As the body portion 102 pivots about the pivoting axis 114 in the second direction 120, hydraulic fluid used to extend and retract the hydraulic cylinders 116 is forced into the accumulator 122, compressing the gas therein. As a result, the accumulator 122 acts a spring and damper combination to cushion the ride of the vehicle 100.

Figure 2:
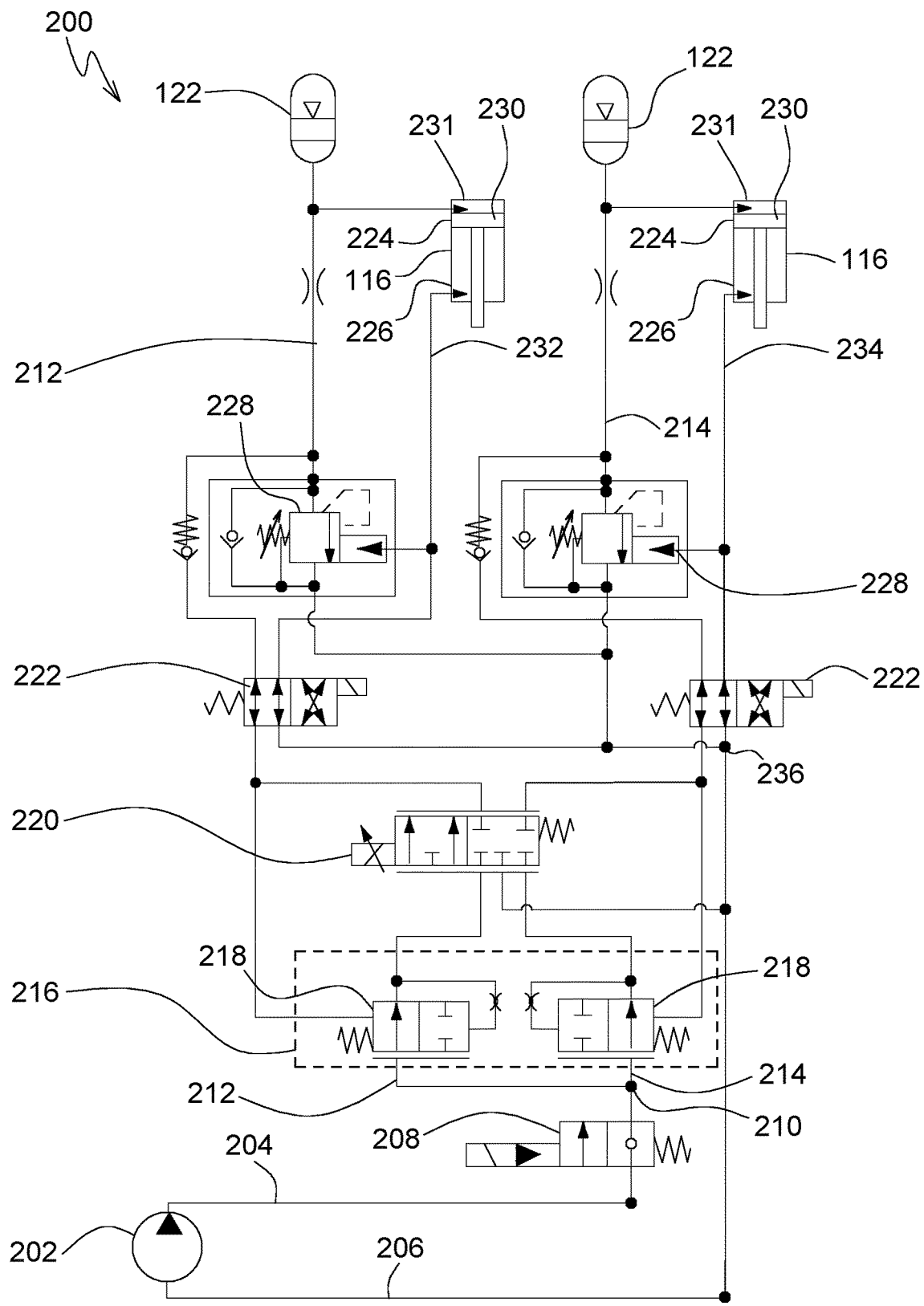
FIG. 2 is a schematic view of an example hydraulic system, according to some implementations of the present disclosure.

FIG. 2 is a schematic view of an example hydraulic system 200 within the scope of the present disclosure. The hydraulic system 200 may be used as a vehicle lift system that lifts a portion of a vehicle relative to another portion of the vehicle. The hydraulic system 200 includes a pump 202 connected to a supply line 204 that carries pressurized hydraulic fluid away from the pump 202 and a return line 206 that returns hydraulic fluid to the pump 202. The supply line 204 is in fluid communication with a solenoid valve 208. In the illustrated example, the solenoid valve 208 is a two-position solenoid valve that has a normally closed configuration. Downstream of the solenoid valve 208, hydraulic fluid flow divides into two separate paths, i.e., into a first fluid flow path 212 and a second fluid flow path 214, at a divider 210. Downstream of the divider 210, a pressure equalization portion 216 is provided that includes a pair of two-position solenoids valves 218. One of the solenoid valves 218 is in fluid communication with each of the fluid flow paths 212, 214. The pressure equalization portion 212 operates to provide equal flow along each fluid flow paths 212 and 214.

Downstream of the pressure equalization portion 212, the fluid flow paths 212 and 214 are in fluid communication with a variable solenoid valve 220. The solenoid valve 220 is a two-position variable solenoid valve that has a normally closed configuration. As the solenoid valve 220 is moved from the closed configuration to an open configuration, an amount of fluid allowed to pass therethrough progressively increases, thereby increasing fluid flow along the first and second fluid flow paths 212 and 214. Consequently, the solenoid valve 220 functions to throttle the flow rate of hydraulic fluid through the first and second fluid flow paths 212 and 214.

Downstream of the solenoid valve 220 are solenoid valves 222. One of the solenoid valves 222 is in fluid communication with each of the fluid flow paths 212 and 214. The solenoid valves 222 are two-position valves. In the illustrated example, a default or first position of the solenoid valves 222 directs hydraulic fluid into a piston or first end 224 of the hydraulic cylinders 116, extending the hydraulic cylinders 116. As a result, the body portion 102 of the vehicle 100 pivots relative to the frame portion 104 in the first direction 118, as shown in FIG. 1. Consequently, leading end 117 of the body portion 102 is raised relative to the frame portion 104 and the surface 107. In some implementations, the solenoid valves 222 operate in unison such that the hydraulic cylinders 116 operate together to raise or lower the body portion 102 relative to the frame portion 104 (i.e., to pivot the body portion 102 in the first direction 118 or the second direction 120).

In a second position, the solenoid valves 222 direct hydraulic fluid through fluid flow paths 232 and 234, which relate to fluid flow paths 212 and 214, respectively. The hydraulic fluid is directed into the rod or second end 226 of the hydraulic cylinders 116, causing the hydraulic cylinders 116 to retract, pivoting the body portion 102 about the pivoting axis 114 in the second direction 120, as shown in FIG. 1. Retraction of the hydraulic cylinders 116 results in leading end 117 of the body portion 102 being lowered relative to the frame portion 104 and the surface 107. An accumulator 122 is in fluid communication with each of the fluid flow paths 212 and 214 upstream of the respective hydraulic cylinders 116. A counterbalance valves 228 is associated with each of the fluid flow paths 212 and 214. The counterbalance valves 228 operate to prevent hydraulic fluid pressure from increasing beyond a selected pressure.

With the solenoid valves 222 in the first position and with hydraulic fluid being provided to the first ends 224 of the hydraulic cylinders 116, hydraulic fluid if forced out of the second ends 226 as pistons 230 within the hydraulic cylinders 116 as the hydraulic cylinders 116 extend. The hydraulic fluid forced out of the second ends 226 are directed through fluid flow paths 232 and 234 and through solenoid valves 222. Upon exiting the solenoid valves 222, the hydraulic fluid removed from the hydraulic cylinders 116 enters the return line 206 at junction 236. The hydraulic fluid passes along the return line 206 and back to the pump 202. In some implementations, the hydraulic fluid passing through the return line 206 may be directed to a reservoir where the hydraulic fluid may be stored until recirculated back to the pump 202.

When the solenoid valves 222 are in the second position and hydraulic fluid is directed into the second ends 226 of the hydraulic cylinders 116 via the fluid flow paths 232 and 234, hydraulic fluid is forced out of the first ends 224 of the hydraulic cylinders 116 through the fluid flow paths 212 and 214, respectively, as the hydraulic cylinders 116 retract. The removed hydraulic fluid passes through the solenoid valves 222 and ultimately into the return line 206. The hydraulic fluid passes along the return line 206 and back to the pump 202 or, in some implementations, a reservoir for later use.

The pre-charge gas pressure in gas-charged hydraulic accumulators is used as a suspension system to isolate a load carried by the vehicle 100 from accelerations inputs experienced by the vehicle 100 as a result of the driving over the ground. Thus, the accumulator provides a spring and damper suspension system to isolate a load carried by the vehicle 100, such as an implement (e.g., a cane harvester head) or loader bucket, from perturbations introduced to the vehicle 100 as the vehicle 100 moves across the ground and, particularly, uneven ground. Changes to the gas pressure within the accumulators 122 alters a stiffness of the suspension provided to the implement 112 by the accumulators 122. In the context of the vehicle 100 shown in FIG. 1, maintaining a selected gas pressure in the accumulators 122 provides a desired level of suspension stiffness for the implement 112 as the vehicle 100 travels over the surface 107, such as a road.

In some instances, determining the pre-charge gas pressure in gas-charged hydraulic accumulators incorporated into a positioning system, such as the accumulators 122 described earlier, involves a time-consuming, laborious maintenance procedure. The maintenance procedures may include releasing hydraulic pressure and disassembly of some components. The present disclosure, however, provides for detecting the pre-charge gas pressure without the cost and time expenditure of such costly maintenance procedures. Particularly, the present disclosure utilizes the behavior of a system containing gas-charged hydraulic accumulators to determine the pre-charge gas pressure and determine whether the pre-charge gas pressure is at a desired level while the accumulators remain installed within a hydraulic system and with the hydraulic system in operational condition.

The spring rate formula for a hydraulic suspension system is as follows:

$$c = n\frac{F_{F1}^2}{P_0 V_0}. \quad \text{Equation 1}$$

In Equation 1, c represents a spring rate; n is a polytropic exponent, which is a constant based on the type of gas and accounts for thermal properties of the gas; $F_{F1}$ is a static suspension force; $P_0$ is the pre-charge gas pressure of a gas-charged hydraulic accumulator; and $V_0$ is an internal volume of the gas-charged hydraulic accumulator. Equation 2 represents the spring force formula:

$$F = c \cdot x \quad \text{Equation 2.}$$

In Equation 2, F represents an applied force; c is the spring rate; and x is an amount of compression or extension of the spring in response to the applied force. Equation 3 represents Newton's Second Law:

$$F = m \cdot a \quad \text{Equation 3.}$$

In Equation 3, F represents an applied force; m represents mass, such as the mass of the body portion, e.g., body portion 102, or a portion of the mass of the body portion not otherwise supported by another part of the vehicle; and a is an acceleration of the mass, m.

Substituting Equation 2 into Equation 3 results in the following expression:

$$c \cdot x = m \cdot a \quad \text{Equation 4.}$$

Solving for c from Equation 4 results in the following expression:

$$c = \frac{m \cdot a}{x}. \quad \text{Equation 5}$$

Substituting Equation 5 into Equation 1 result in the following expression:

$$\frac{m \cdot a}{x} = n \cdot \frac{F_{F1}^2}{P_0 V_0}$$

Equation 6.
Solving for $P_0$ results in the following expression:

$$P_0 = P_0(x, a) = \left(\frac{x}{a}\right)\left(\frac{n \cdot F_{F1}}{V_o \cdot m}\right). \quad \text{Equation 7}$$

where $P_0$ is the pre-charge gas pressure within the gas-charged hydraulic accumulator; x is the distance that a first portion of the vehicle, e.g., a body portion such as body portion 102, rebounds relative to the second portion of the vehicle, e.g., a frame portion such as frame portion 104; a is the acceleration of the first portion of the vehicle as the first portion of the vehicle falls relative to the second portion of the vehicle; n is a polytropic exponent of the gas contained in the gas-charged hydraulic accumulator; $F_{F1}$ is the static suspension force, i.e., a force used to maintain the first portion, such as body portion 102, in a vertically stationary position; $V_0$ is the internal volume of the gas-charged hydraulic accumulator; and m is the mass of the first portion or part of the first portion of the vehicle supported by $F_{F1}$. For example, in some implementations, a part of the first portion of the vehicle, such as the body portion 102, may be supported by one or more axles of the vehicle. The remainder of the first portion corresponds to the mass, m.

Operation of a hydraulic system, the resulting response of the hydraulic system, and Equation 7 are used to determine the pre-charge gas pressure of a gas-charged hydraulic accumulator. Application of these concepts is described in the context of the example hydraulic system 200. However, it is to be understood that these principles are applicable to other hydraulic systems.

Figure 3:
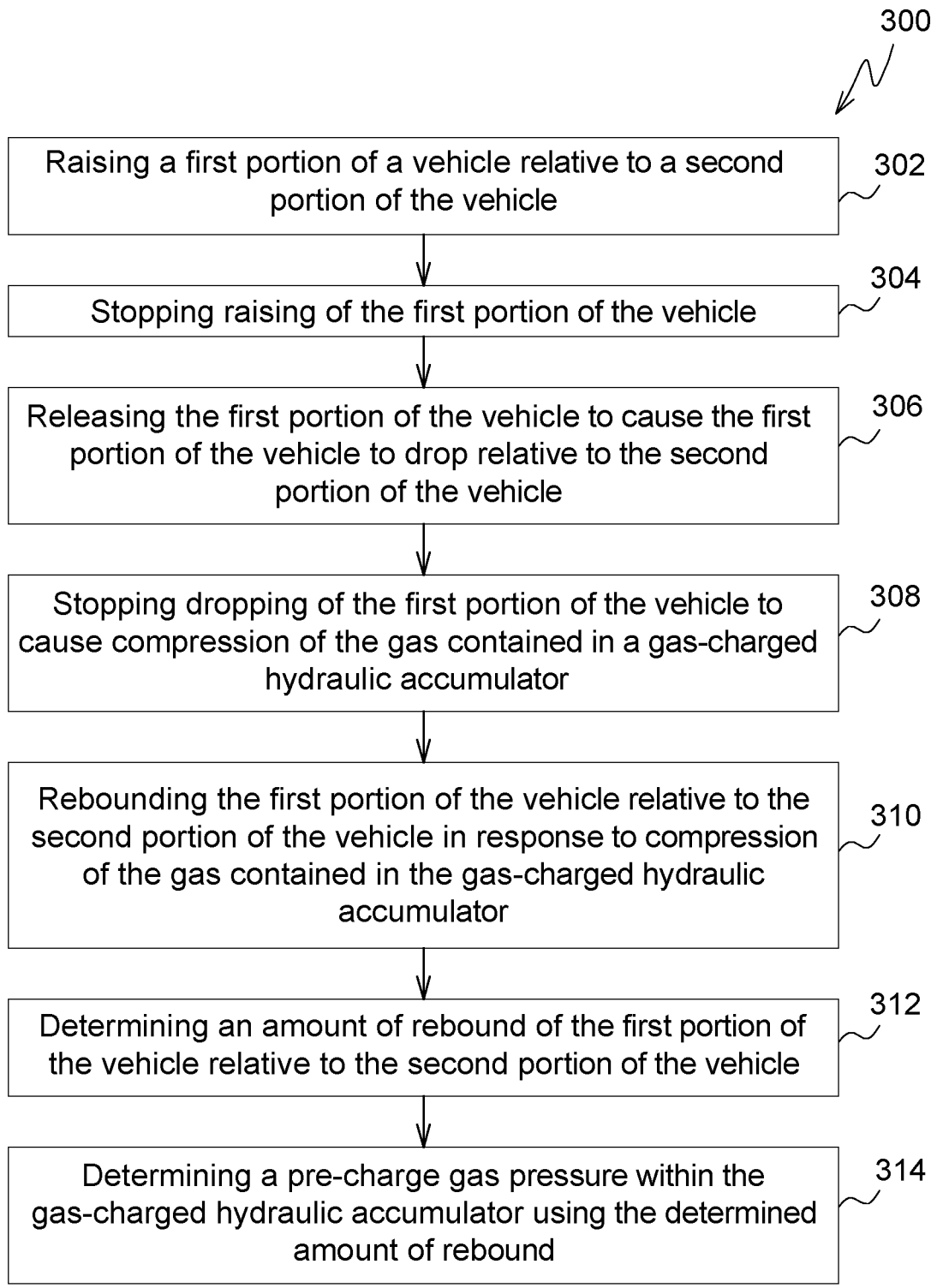
FIG. 3 is a flow chart of an example method of determining the pre-charged gas pressure, according to some implementations of the present disclosure.

FIG. 3 is an example method of determining the pre-charged gas pressure, $P_0$, of a gas-charged hydraulic accumulator installed on a vehicle. Particularly, the example method 300 is described in the context of an accumulator incorporated into a hydraulic system similar to hydraulic system 200 used to raise and lower a body portion of a vehicle relative to a frame portion. Although the description describes a vehicle having a body portion pivotably coupled to a frame portion, the scope of the disclosure is not so limited. Rather, vehicles having a body portion that is coupled to a frame portion in a non-pivoting arrangement are also within the scope of the present disclosure. Further, the scope of the present disclosure is even broader and is applicable to one portion of a machine movable relative to another portion of the machine by a hydraulic actuator in a hydraulic system that includes a gas-charged hydraulic accumulator.

At 302, a first portion of a vehicle is raised relative to a second portion of the vehicle. The first portion of a vehicle may be a body portion, such as body portion 102, and the second portion of a vehicle may be a frame portion, such as frame portion 104. For example, in the context of the vehicle 100 of FIG. 1, the body portion 102 may be raised relative to the frame portion 104 by pivoting the body portion 102 relative to the body portion 104 about the pivoting axis 114 in the first direction 118 such that an angle defined between the body portion 102 and the frame potion 104 increases. As explained earlier, in other implementations, a body portion of a vehicle may be coupled to a frame portion of the vehicle in a manner other than a pivotable connection. As such, the scope of the present disclosure includes vehicles in which all or a portion of a part of the vehicle (e.g., a body portion) moves relative to the another of the vehicle (e.g., a frame portion).

The first portion of the vehicle may be raised relative to the second portion of the vehicle with one or more hydraulic cylinders. The hydraulic pressure applied to the hydraulic cylinders, such as hydraulic cylinders 116, to lift the first portion of the vehicle relative to the second portion of the vehicle may be greater than a nominal hydraulic pressure applied within a hydraulic system to which the hydraulic cylinders form a part. The nominal hydraulic pressure applied by a hydraulic pump to hydraulic fluid within the hydraulic system may be a hydraulic pressure that is insufficient to move the first portion of the vehicle relative to the second portion of the vehicle. For example, the nominal hydraulic pressure may be a default hydraulic pressure present within a hydraulic system during operation of the hydraulic system. Thus, an increased hydraulic pressure above the nominal hydraulic pressure is applied to raise the first portion of the vehicle.

Figure 4:
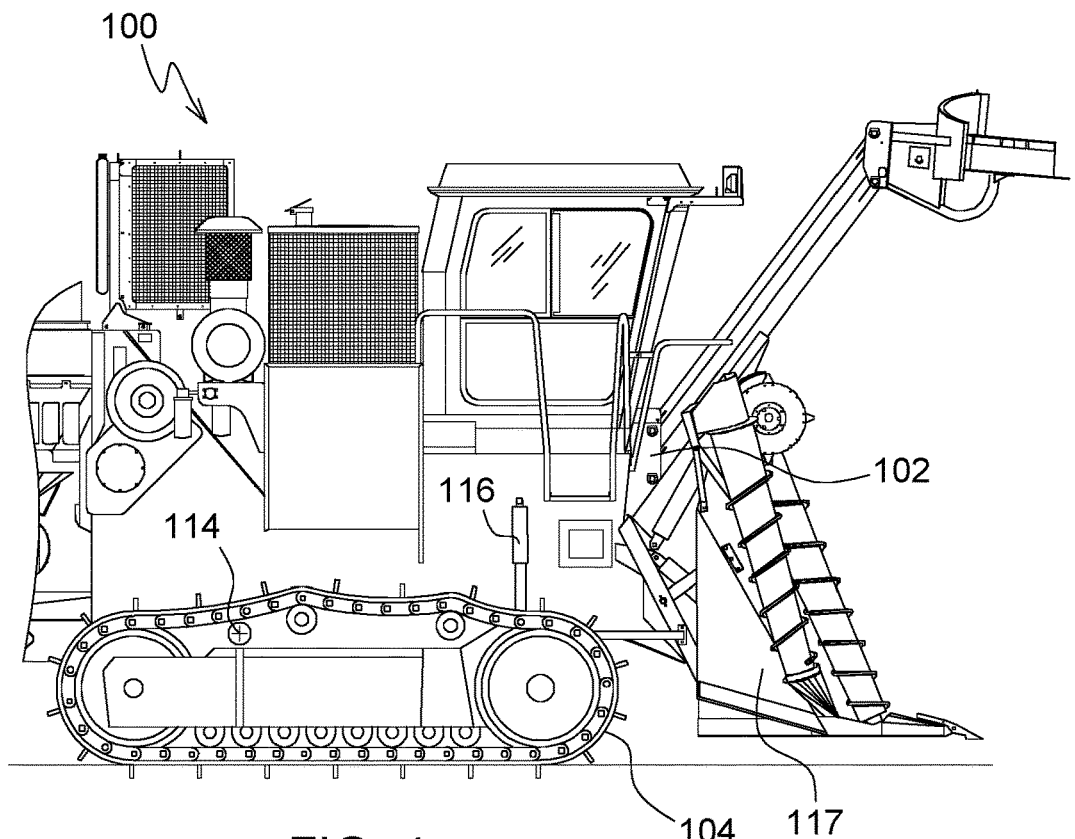
FIG. 4 is a side view of the vehicle of FIG. 1 with the body portion raised relative to the frame portion, according to some implementations of the present disclosure.

The hydraulic cylinders are in fluid communication with the accumulator. For example, in the context of the hydraulic system 200 of FIG. 1, the hydraulic cylinders 116 are raised by moving the solenoid valve 208 into the open configuration allowing hydraulic fluid to pass from the supply line 204, through the solenoid valve 208, and into the first and second fluid flow paths 212 and 214. Also, the solenoid valve 220 is moved in the open configuration, allowing hydraulic fluid to pass to the solenoid valves 222, which are positioned in the first position. In the first position, the solenoid valves 222 pass hydraulic fluid to the first ends 224 of the hydraulic cylinders 116, causing the hydraulic cylinders 116 to extend and raising the body portion 102 of the vehicle 100 relative to the frame portion 104 and, consequently, to the surface 107 (e.g., ground). FIG. 4 is a side view of portions of the body portion 102 and frame portion 104 shown in FIG. 1 with the body portion 102 raised relative to the frame portion 104. In the context of the vehicle 100 shown in FIGS. 1 and 4, the body portion 102 is raised relative to the frame portion 104 and the surface 107 by pivoting the body portion 102 relative to the frame portion 104 about the pivoting axis 114 in the first direction 118 by extension of the hydraulic cylinders 116.

The first portion of the vehicle is raised to a selected level relative to the second portion. Particularly, the one or more hydraulic cylinders are extended by a selected amount. In some implementations, the one or more hydraulic cylinders may be extended an entire stroke of the one or more hydraulic cylinders. In other implementations, the one or more cylinders may be extended by a portion of the entire stroke of the one or more cylinders. In some instances, determination of pre-charge gas pressure is improved as the distance that the first portion of the vehicle falls increases. Consequently, as a height by which the first portion is raised increases relative to the second portion and, more particularly, a location where the fall of the first portion of the vehicle is stopped, determination of the pre-charge gas pressure is improved. That is, determination of pre-charge gas pressure is improved as the amount of potential energy of the first portion, relative to the second portion, increases. However, as previously explained, a height by which the body portion is raised corresponding to less than full extension of the one or more hydraulic cylinders may also be used.

At 304, once the first portion of the vehicle is raised by the selected amount, raising of the first portion is stopped. Referring to FIG. 2, raising of the body portion 102 is stopped by placing solenoid valves 208 and 220 in the closed configuration. At 306, the first portion of the vehicle is released, and the first portion of the vehicle drops relative to the second portion. At this step, dropping the first portion of the vehicle includes both passive and active movement of the first portion of the vehicle relative to the second portion. Particularly, dropping of the first portion includes falling of the first portion due solely to gravity as well as dropping that involves actively driving the first portion towards the second portion of the vehicle. In some implementations, the first portion of the vehicle is permitted to free-fall via gravity from the raised position towards the second portion of the vehicle. In other implementations, the first portion of the vehicle may be actively driven towards the second portion of the vehicle after release from the raised position.

Referring again to FIGS. 1 and 2, the body portion 102 of the vehicle is permitted to free-fall relative to the frame portion 104 (and, correspondingly, the ground (i.e., surface 107)) by maintaining the solenoid valves 208 and 220 in the closed configuration and repositioning the solenoid valves 222 to the second position. Although an unassisted gravity free-fall is one approach within the scope of the present disclosure, a power-assisted downward movement of the body portion 102, such as via a downward force applied with a hydraulic cylinder, is also within the scope of the present disclosure. Gravitational forces cause the body portion 102 to move towards the frame portion 104 by rotation about the pivoting axis 114 in the second direction 120. As the body portion 102 falls, hydraulic fluid is forced from the first end 224 of the hydraulic cylinders 116 and directed to the return line 206 as described earlier.

In other implementations, the body portion 102 may be actively driven downwards towards the frame portion 104 (i.e., rotated about the pivoting axis 114 in the second direction 120) by moving the solenoid valves 208 and 220 back into the open configuration and moving the solenoid valves 222 into the second position. As a result, hydraulic pressure forces the hydraulic cylinders 116 to retract, actively forcing the body portion 102 towards the frame portion 104 by rotating the body portion 102 about the pivoting axis 114 in the second direction 120. The hydraulic pressure applied to the hydraulic cylinders to drive the first portion of the vehicle downwards may be greater than the nominal hydraulic pressure.

Figure 5:
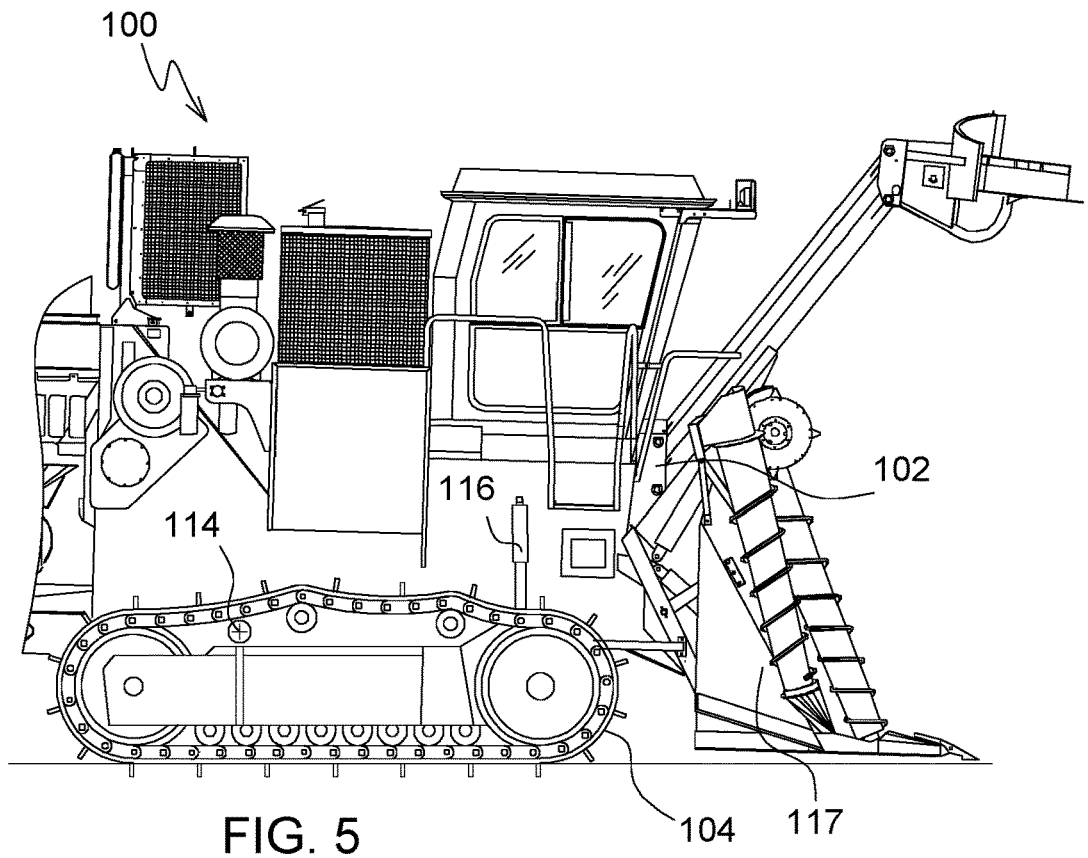
FIG. 5 is another side view of the vehicle of FIG. 1 with the body portion at an end of a drop, according to some implementations of the present disclosure.

At 308, dropping of the first portion of the vehicle, whether the dropping is active or passive, is ceased, and, as a result, gas contained in the gas-charged hydraulic accumulator is compressed at 310 in response to inertial forces. Referring again to FIGS. 1 and 2, dropping of the body portion 102 is stopped by moving the solenoid valves 208 and 220 into the closed configuration. With these solenoid valves 208 and 220 closed, inertia of the body portion 102 causes the hydraulic cylinders 116 to force hydraulic fluid into the accumulators 122, causing the gas contained within the accumulators 122 to compress. FIG. 5 is another side view of portions of the body portion 102 and frame portion 104 shown in FIG. 1 with the body portion 102 shown at an end of the drop and the hydraulic cylinders 116 compressed in a retracted condition.

It is noted that the drop of the first portion of the vehicle is stopped before physical contact is made with another object, such as the second portion, the ground, or some other object, or by bottoming out of the one or more of the hydraulic actuators used to move the first portion. For example, in the context of the example of FIGS. 1 and 2, the drop of the body portion 102 is stopped before the body portion 102 contacts the surface 107, the frame portion 104, or another object or before the hydraulic cylinders 116 reach an end of the stroke of the hydraulic cylinders 116. Stopping retraction of the hydraulic cylinders 116 before an end of the stroke is reached prevents physical contact between two solid parts of the hydraulic cylinders 116, such as contact between the pistons 230 and an end of a housing of 231 the hydraulic cylinders 116.

At 310, the compressed gas within the gas-charged hydraulic accumulators causes the first portion of the vehicle to rebound relative to the second portion of the vehicle. At 312, an amount of the rebound of the first portion of the vehicle relative to the second portion of the vehicle is measured or otherwise determined. In some implementations, the amount of rebound corresponds to or is determined using an amount of extension of a hydraulic cylinder used to move the first portion relative to the second portion. In some implementations, the amount of rebound is determined using a sensor, such as a position sensor. In some examples, the position sensor is a linear sensor or a rotary sensor. For example, in some instances, a linear sensor that runs parallel to a hydraulic cylinder, such as the hydraulic cylinder 116, is used to determine the amount of rebound. Alternatively, or in addition, a rotary sensor located, for example, at the pivoting axis 114, is used to determine the amount of rebound of the first portion of the vehicle. Still further, other sensors may be used. For example, one or more other sensors, in combination with geometry of the vehicle, is used to determine the amount of rebound of the first portion relative to the second portion.

At 314, the pre-charge gas pressure, $P_0$, of the gas-charged hydraulic accumulator is determined. The pre-charge gas pressure may be determined using Equation 7, described earlier. As the pre-charge gas pressure in a gas-charged hydraulic accumulator decreases, the magnitude of the rebound of the first portion of the vehicle tends to increase. With the pre-charge gas pressure determined, a determination as to whether the pre-charge gas pressure is below a selected level may be made. If the pre-charge gas pressure is below a selected level, the accumulator may require replacement or maintenance to alter the pre-charge gas pressure.

Figure 6:
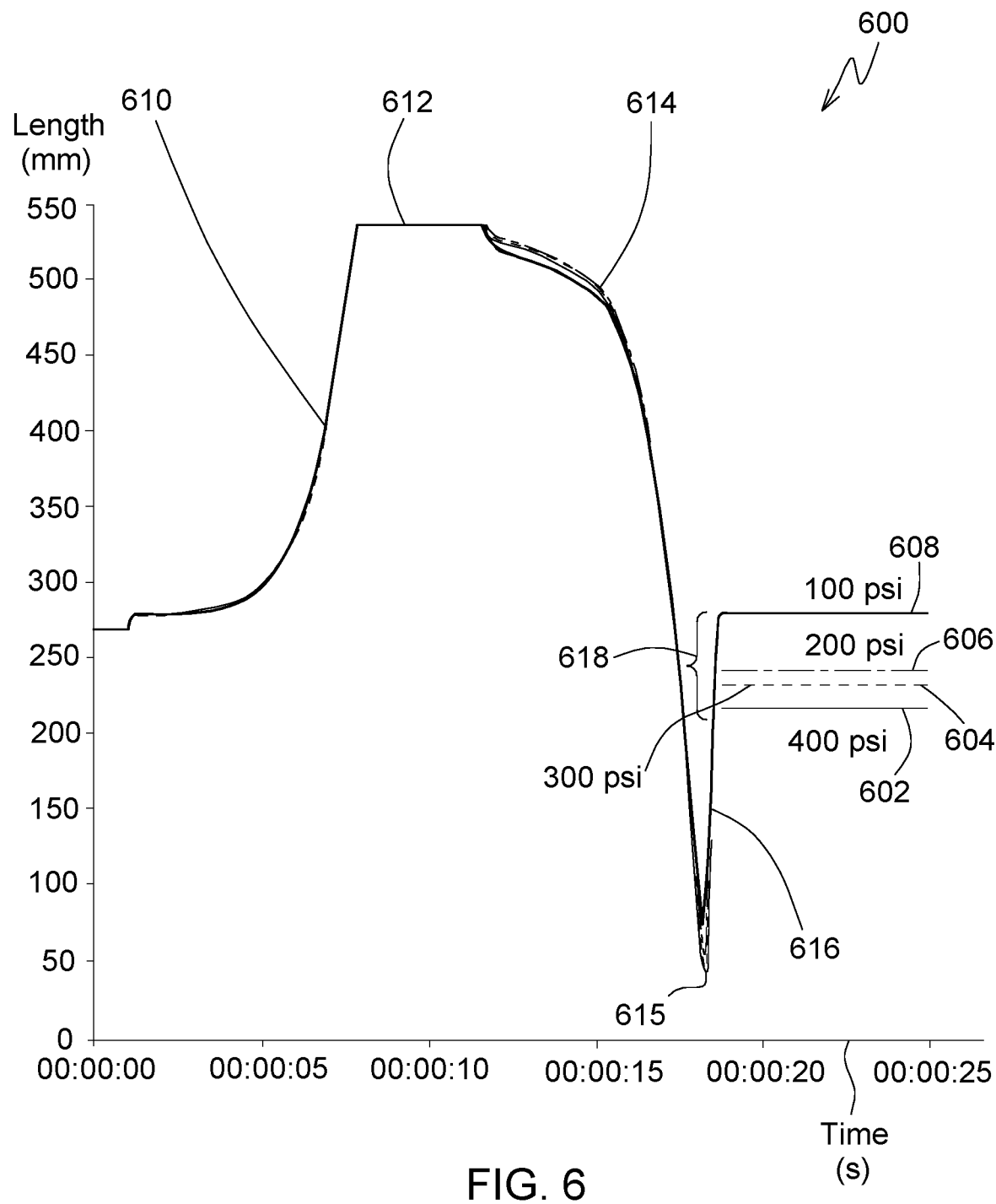
FIG. 6 is an example chart that includes a plurality of graphs depicting a length of a hydraulic cylinder over time used to determine a pre-charge gas pressure, according to some implementations of the present disclosure.

FIG. 6 is an example chart 600 that includes a plurality of graphs 602, 604, 606, and 608. In this example, each of the graphs represents a change in length (in millimeters (mm)) over time (in seconds (s)) of a hydraulic cylinder used to position a first portion of a vehicle, which may be similar to the body portion 102 of the vehicle 100, relative to a second portion of the vehicle, such as frame portion 104. A first portion 610 of the graphs 602, 604, 606, and 608 indicates raising the first portion (or at least a portion of the first portion) relative to a second portion. A second portion 612 indicates that raising of the first portion has ceased. A third portion 614 of the graphs 602, 604, 606, and 608 indicates dropping of the first portion relative to the second portion after release of the first portion from the raised position. Points of the graphs 602, 604, 606, and 608 indicated at 615 indicate when the drop of the first portion stopped, and a fifth portion 616 of the graphs 602, 604, 606, and 608 indicate rebound of the first portion of the vehicle relative to the second portion. A sixth portion 618 show the final resting position of the first portion after the rebound and the pre-charge gas pressures associated with each of the graphs 602, 604, 606, and 608.

In this example, a target pre-charge gas pressure is 400 pounds per square inch (psi), which corresponds to the least amount of rebound amongst the graphs, and is represented by graph 602. The pre-charge gas pressures of 300 psi, 200 psi, and 100 psi corresponds to graphs 604, 606, and 608, respectively. Thus, the pre-charge gas pressures of graphs 604, 606, and 608 are below the target value of 400 psi. It is also noted that, as the pre-charge gas pressures decrease, the amount of rebound increases.

Figure 7:
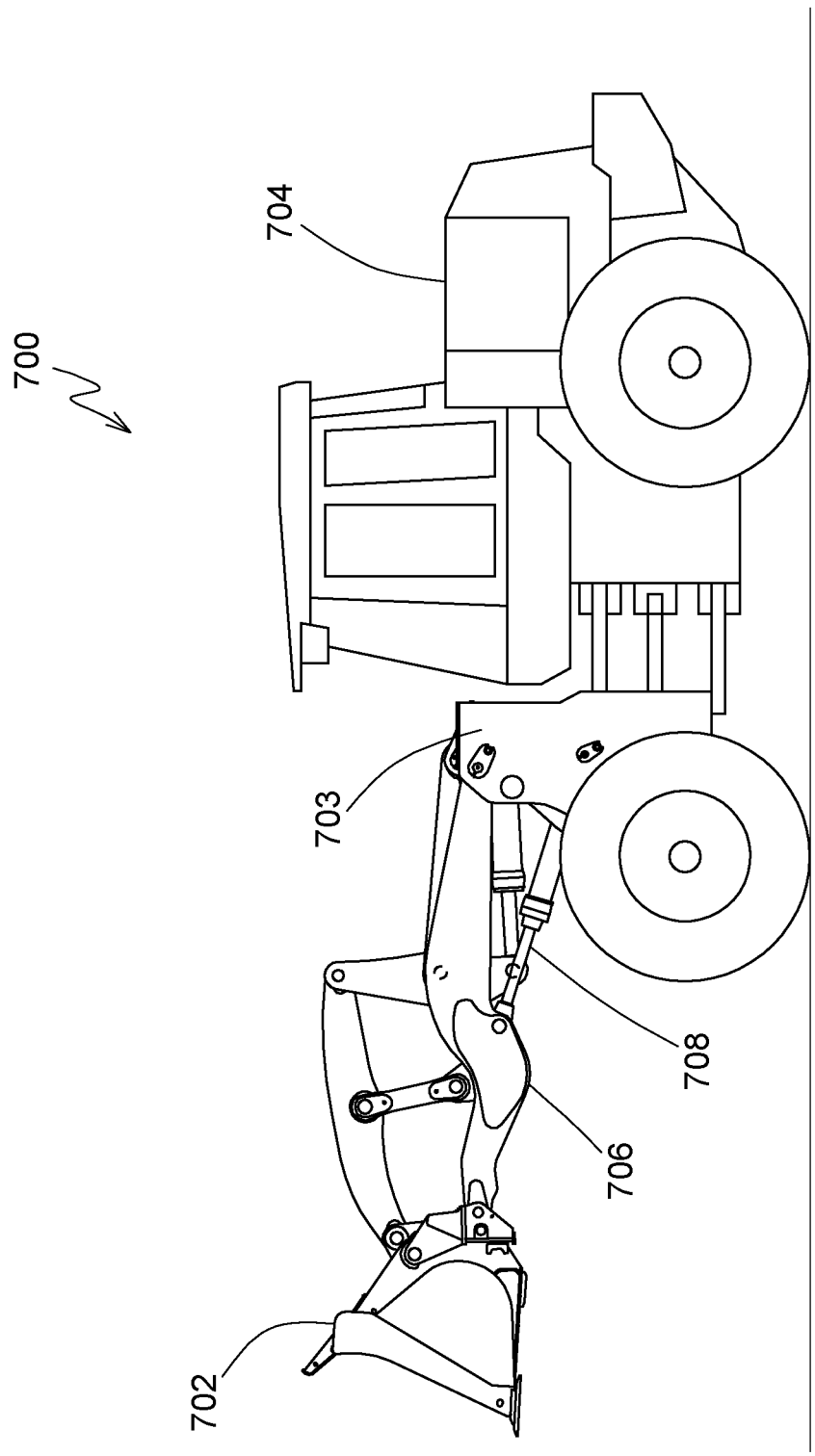
FIG. 7 is a side view of an example construction vehicle that includes a gas-charged hydraulic accumulator on a hydraulic system used to articulate a bucket attached at a forward end of the vehicle, according to some implementations of the present disclosure.

FIG. 7 is a side view of an example construction vehicle 700 that utilizes a gas-charged hydraulic accumulator in a hydraulic system used to articulate an arm 706 and bucket 702 attached at a forward end 703 of the vehicle 700. The vehicle 700 includes a drive portion 704, the arm 706 pivotably coupled to the drive portion 704, and the bucket 702 pivotably coupled to the arm 706. A hydraulic cylinder 708 operates to raise and lower the arm 706 and, hence, the bucket 702.

Figure 8:
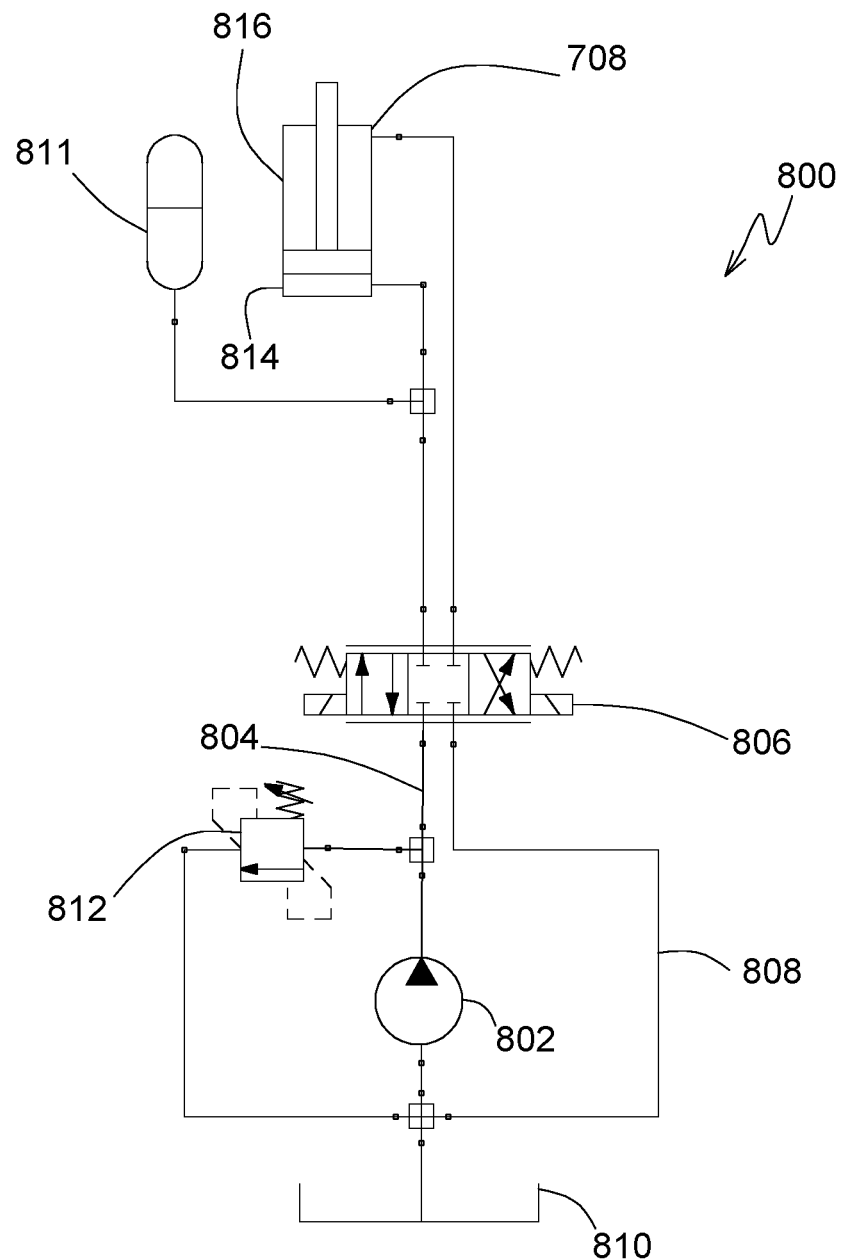
FIG. 8 is a schematic of an example hydraulic system that functions to operate a hydraulic cylinder, according to some implementations of the present disclosure.

FIG. 8 is a schematic of an example hydraulic system 800 that functions to operate the hydraulic cylinder 708 of FIG. 7. The hydraulic system 800 includes a pump 802; a supply line 804 that directs hydraulic fluid to a three-position solenoid valve 806; a return line 808 that directs hydraulic fluid from the solenoid valve 806; a reservoir 810 that accepts fluid discharged from the hydraulic cylinder 708; and a gas-charged hydraulic accumulator 811. Similar to the accumulators 122 described earlier, the accumulator 811 operates as a suspension system to isolate a load, such as the arm 706, bucket 702, and any material within the bucket 702, from accelerations input to the construction vehicle 700, such as inputs to the vehicle 700 as the vehicle 700 moves along uneven ground. The pump 802 receives hydraulic fluid from the reservoir 810. The hydraulic system 800 also includes a relieve valve 812 that operates to release hydraulic pressure when hydraulic pressure exceeds a selected pressure.

The solenoid valve 806 has a default closed position; a first open position permitting hydraulic fluid flow from the inlet line 804 into a piston or first end 814 of the hydraulic cylinder 708 and hydraulic fluid flow out of a rod or second end 816 of the hydraulic cylinder 708 into the outlet line 808; and a second open position permitting hydraulic fluid flow from the inlet line 804 into the second end 816 of the hydraulic fluid from the inlet line 804 and hydraulic fluid flow from the first end 814 of the hydraulic cylinder 708 and into the outlet line 808, which conducts the hydraulic fluid to the reservoir 810. With the solenoid valve 806 in the first open position, the hydraulic cylinder 708 is extended, and, with the solenoid valve 806 in the second open position, the hydraulic cylinder 708 is retracted.

With reference to FIGS. 7 and 8, determination of the pre-charge gas pressure in the accumulator 811 is described. The arm 706 and bucket 702 are raised relative to the drive portion 704 of the vehicle 700 by extending the hydraulic cylinder 708. To extend the hydraulic cylinder, the solenoid valve 806 is moved into the first open position allowing hydraulic fluid from the pump 802 to the first end 814 of the hydraulic cylinder 708 and hydraulic fluid from the second end 816 of the hydraulic cylinder 708 into the outlet line 808. The arm 706 and bucket 702 are raised by a selected amount relative to the drive portion 704 and the ground. In some implementations, the hydraulic cylinder 708 is extended fully to raise the arm 706 and bucket 702 a maximum amount. In other implementations, the hydraulic cylinder 708 is extended less than the full amount. Extension of the hydraulic cylinder 708 is stopped when the hydraulic cylinder 708 is extended the selected amount.

In some implementations, the arm 706 and bucket 702 are then allowed to fall, under force, by application of hydraulic pressure to the second end 816 of the hydraulic cylinder 708. To apply the hydraulic pressure, the solenoid valve 806 is moved into the second open position, allowing pumped hydraulic fluid from the inlet line 804 into the second end 816 of the hydraulic cylinder 708. With the solenoid valve 806 in the second open position, hydraulic fluid from the first end 814 of the hydraulic cylinder 708 is permitted to drain into the outlet line 808. As a result, the arm 706 and bucket 702 are forcedly lowered relative to the drive portion 704 and the ground. In other implementation, the hydraulic system 800 may be configured to permit arm 706 and the bucket 702 to fall passively due to gravity and without being forcedly lowered by hydraulic pressure applied to the first end 814 of the hydraulic cylinder 708.

Lowering of the arm 706 and the bucket 702 is stopped prior to the arm 706 or bucket 702 contacting the ground, the drive portion 704, or some other object or before the piston of the hydraulic cylinder 708 bottoms out. Lowering of the arm 706 and the bucket 702 is stopped by moving the solenoid valve 806 to the default closed position. As a result, the arm 706 and bucket 702 rebound in a manner similar to the body portion 102, described earlier, causing gas within the gas-charged hydraulic accumulator 811 to compress. The amount of rebound may be sensed with a sensor, such as a linear displacement sensor (such as a linear sensor extending parallel to the hydraulic cylinder 708) or radial sensor attached to a pivot of the vehicle 700 (such as a pivot connecting the arm 706 to the drive portion 704 of the vehicle 700). An amount of rebound is used to determine the pre-charge gas pressure within the accumulator as described earlier. With determination of the pre-charge gas pressure, a determination as to whether the accumulator 811 should be serviced or replaced can be made.

Without in any way limiting the scope, interpretation, or application of the claims appearing below, a technical effect of one or more of the example implementations disclosed herein is determining a pre-charge gas pressure of a gas-charged hydraulic accumulator with the use of a position sensor. Another technical effect of one or more of the example implementations disclosed herein is determining a pre-charge gas pressure of a gas-charged hydraulic accumulator without the use of a pressure sensor. Another technical effect of one or more of the example implementations disclosed herein is determining a pre-charge gas pressure of a gas-charged hydraulic accumulator in less time and at a lower cost associated with removal of the accumulator from a vehicle to determine the pre-charge gas pressure.

The pre-charge gas pressure is determinable in another way, discussed below. The approach discussed below avoids an acceleration term for the moving mass, such as the body portion 102. In this example, the relationship is as follows:

$$P_0 = \left( \frac{\Delta V \cdot P_{Stat} \cdot P_{Dyn}}{P_{Dyn} - P_{Stat}} \right).$$ Equation 8 where ΔV is the change in volume of a hydraulic cylinder, such as hydraulic cylinder 116, associated with rebounding of a portion of a vehicle, such as body portion 102 of vehicle 100; $P_{Stat}$ is the hydraulic pressure used to maintain the portion of the vehicle being displaced, e.g., body portion 102, in a stationary or static position relative to another portion of the vehicle, such as frame portion 104 of the vehicle 100; and $P_{Dyn}$ is the hydraulic pressure experienced by a hydraulic cylinder when the portion of the vehicle stops falling from a raised position.

FIG. 10 is a flow chart for another example method 1000 for determining a pre-charge gas pressure, $P_0$, of a gas-charged hydraulic accumulator installed on a vehicle. Particularly, the example method 1000 is described in the context of an accumulator incorporated into a hydraulic system similar to hydraulic system 200 used to raise and lower a body portion of a vehicle relative to a frame portion. Although the description describes a vehicle having a body portion pivotably coupled to a frame portion, the scope of the disclosure encompasses other types of vehicles, such as vehicles having a body portion that is coupled to a frame portion in a non-pivoting arrangement. Further, the scope of the present disclosure is applicable to one portion of a machine movable relative to another portion of the machine by a hydraulic actuator in a hydraulic system that includes a gas-charged hydraulic accumulator.

At 1002, a static hydraulic pressure, $P_{stat}$, corresponding to a pressure used to hold first portion of a vehicle, such as the body portion 102 of the vehicle as shown in FIG. 1, at a stationary position relative to a second portion of the vehicle, such as the frame portion 104, is sensed. For example, referring to FIG. 2, the static hydraulic pressure is a hydraulic pressure used to maintain the cylinders 116 in a static condition.

At 1004, the first portion of the vehicle is raised a selected amount relative to the second portion of the vehicle with one or more hydraulic cylinders. The hydraulic pressure applied to the hydraulic cylinders, such as hydraulic cylinders 116, to lift the first portion of the vehicle relative to the second portion of the vehicle is greater than the static hydraulic pressure or a nominal hydraulic pressure of the hydraulic system. As explained above, the nominal hydraulic pressure applied by a hydraulic pump to hydraulic fluid within the hydraulic system is a hydraulic pressure that is insufficient to move the first portion of the vehicle relative to the second portion of the vehicle. Thus, an increased hydraulic pressure above the static hydraulic pressure and the nominal hydraulic pressure is applied to raise the first portion of the vehicle. The first portion of the vehicle is raised relative to the second portion of the vehicle by a selected amount.

The hydraulic cylinders are in fluid communication with an accumulator, such as accumulator 122 described earlier. In the context of the hydraulic system 200 of FIG. 1, the hydraulic cylinders 116 are raised by moving the solenoid valve 108 into the open configuration allowing hydraulic fluid to pass from the supply line 204, through the solenoid valve 208, and into the first and second fluid flow paths 212 and 214. Also, the solenoid valve 220 is moved into the open configuration, allowing hydraulic fluid to pass to the solenoid valves 222 positioned in the first position. In the first position, the solenoid valves 222 pass hydraulic fluid to the first ends 224 of the hydraulic cylinders 116, causing the hydraulic cylinders 116 to extend and raising the body portion 102 of the vehicle 100 relative to the frame portion 104 and, consequently, to the surface 107 (e.g., ground). In some implementations, the amount by which the first portion of the vehicle is raised relative to the second portion of the vehicle corresponds to full extension of the hydraulic cylinders 116.

At 1006, once the first portion of the vehicle is raised by the selected amount, raising of the first portion is stopped. Referring to FIG. 2, raising of the body portion 102 is stopped by placing solenoid valves 208 and 220 in the closed configuration. At 1008, the first portion of the vehicle is released, and the first portion of the vehicle drops relative to the second portion. As explained above, dropping the first portion of the vehicle encompasses both passive (i.e., free-fall via gravity) and active movement (e.g., actively driving using hydraulic power) of the first portion of the vehicle relative to the second portion.

At 1010, dropping of the first portion of the vehicle is ceased, and, as a result, gas contained in the gas-charged hydraulic accumulator is compressed. The gas is compressed by hydraulic pressure in response to inertial forces. Referring again to FIGS. 1 and 2, dropping of the body portion 102 is stopped by moving the solenoid valves 208 and 220 into the closed configuration. With these solenoid valves 208 and 220 closed, inertia of the body portion 102 causes the hydraulic cylinders 116 to force hydraulic fluid into the accumulators 122, causing the gas contained within the accumulators 122 to compress. The dropping of the first portion of the vehicle is stopped before physical contact is made with another object, such as the second portion of the vehicle, the ground, or some other object, or by bottoming out of the one or more of the hydraulic actuators used to move the first portion. Stopping retraction of the hydraulic cylinders 116 before an end of the stroke thereof is reached prevents physical contact between two solid parts of the hydraulic cylinders 116, such as contact between the pistons 230 and an end of a housing of 231 the hydraulic cylinders 116.

At 1012, the dynamic hydraulic pressure, $P_{Dyn}$, is sensed when the first portion of the vehicle stops falling, as indicated at 614 in FIG. 6. In the context of actively driving the first portion of the vehicle towards the second portion of the vehicle, the dynamic hydraulic pressure corresponds to the pressure of the hydraulic fluid generated by the hydraulic pump, such as pump 202 shown in FIG. 2. That is, the hydraulic pressure generated by the pump 202 is sensed when falling of the first portion of the vehicle stops, and that sensed hydraulic pressure corresponds to the dynamic hydraulic pressure, $P_{Dyn}$. For example, in the context of FIG. 8, $P_{Dyn}$ is sensed at the second end 816 of the hydraulic cylinder 708. Where the first portion of the vehicle drops as a result of gravity without actively driving the first portion with a hydraulic cylinder, the $P_{Dyn}$ is determined using a rate at which the hydraulic cylinder is retracting during the fall of the first body portion, a hydraulic pressure existing within a hydraulic system between the outlet of the hydraulic cylinder, and flow restrictions in the hydraulic system between the outlet of the hydraulic cylinder and the reservoir of the hydraulic system. Using the flow restrictions and other information associated with the system (e.g., pipe diameters, pipe length, etc.), a flow rate of hydraulic fluid from the hydraulic cylinder is used to determine $P_{Dyn}$. Thus, using this information, the $P_{Dyn}$ associated with dropping of the first body portion without actively driving the first body portion of the vehicle is determinable.

At 1014, the compressed gas within the gas-charged hydraulic accumulators causes the first portion of the vehicle to rebound relative to the second portion of the vehicle. At 1016, an amount of the rebound of the first portion of the vehicle relative to the second portion of the vehicle is measured or otherwise determined. In some implementations, the amount of rebound corresponds to or is determined using an amount of extension of a hydraulic cylinder used to move the first portion relative to the second portion. In some implementations, the amount of rebound is determined using a sensor, such as a position sensor. In some examples, the position sensor is a linear sensor or a rotary sensor. For example, in some instances, a linear sensor that runs parallel to a hydraulic cylinder, such as the hydraulic cylinder 116, is used to determine the amount of rebound. Alternatively, or in addition, a rotary sensor located, for example, at the pivoting axis 114, is used to determine the amount of rebound of the first portion of the vehicle. Still further, other sensors may be used. For example, one or more other sensors, in combination with geometry of the vehicle, is used to determine the amount of rebound of the first portion relative to the second portion.

Using the amount of rebound, a change of volume of the hydraulic cylinders used for displacing the first portion of the vehicle relative to the second portion of the vehicle is determined at 1018. For example, for hydraulic cylinders having a constant cylindrical shape (e.g., a constant diameter along a length of the hydraulic cylinders), a volume change is determinable using the detected amount of rebound. As explained above, in some implementations, the detected amount of rebound corresponds to an amount by which the hydraulic cylinders extend during rebounding of the first body portion of the vehicle. Using this change in length of the hydraulic cylinder, a volume change associated with the rebound is determined. For example, for a hydraulic cylinder having a constant circular cross-section, a change in volume, $\Delta V$, of the hydraulic cylinders is determined using the following equation:

$$\Delta V = \pi \cdot D \cdot \Delta L \quad \text{Equation 9.}$$

where D is the inner diameter of the hydraulic cylinder and $\Delta L$ is the change in length of the hydraulic cylinder, i.e., the amount of extension of the hydraulic cylinder, associated with the rebound of the first body portion of the vehicle. Particularly, in some implementations, the $\Delta L$ is the extension of the hydraulic cylinder(s) associated with the change from position 614 to position 618, as shown in FIG. 6. Changes in length and volume of the hydraulic cylinder associated with the rebound of the first portion of the vehicle are also determinable for hydraulic cylinders having other cross-sectional shapes. Consequently, the scope of the present disclosure encompasses other types of hydraulic cylinders having other sizes and shapes.

In some implementations, for a hydraulic cylinder having a circular cross-section and, the change in volume, $\Delta V$, is determined using Equation 9 and the amount of rebound determined at 1016. Using the determined change in volume, the pre-charge gas pressure of the accumulators, such as accumulator 122, are determined using Equation 8. Generally, as the pre-charge gas pressure decreases, the amount of rebound increases.

At 1020, the pre-charge gas pressure of the gas-charged hydraulic accumulator is determined. For example, in some implementations, the pre-charge gas pressure, $P_0$, is determined using the sensed static pressure, $P_{stat}$; the determined dynamic pressure, $P_{Dyn}$; and the determined change in volume, $\Delta V$, of the hydraulic cylinder in accordance with Equation 8. At 1022, the pre-charge gas pressure is adjusted if the determined pre-charge gas pressure is different than a selected pressure value or is outside of a selected pressure range. For example, the pressure range may be selected to provide a selected height of a first portion of the vehicle above the ground so that the first portion of the vehicle avoids contacting the ground during movement of the vehicle along the ground. Consequently, if the pre-charge gas pressure is less than a selected pressure value or pressure range, the pre-charge gas pressure is increased. Alternatively, if the pre-charge gas pressure is greater than the selected pressure or pressure range, the pre-charge gas pressure is decreased.

Figure 9:
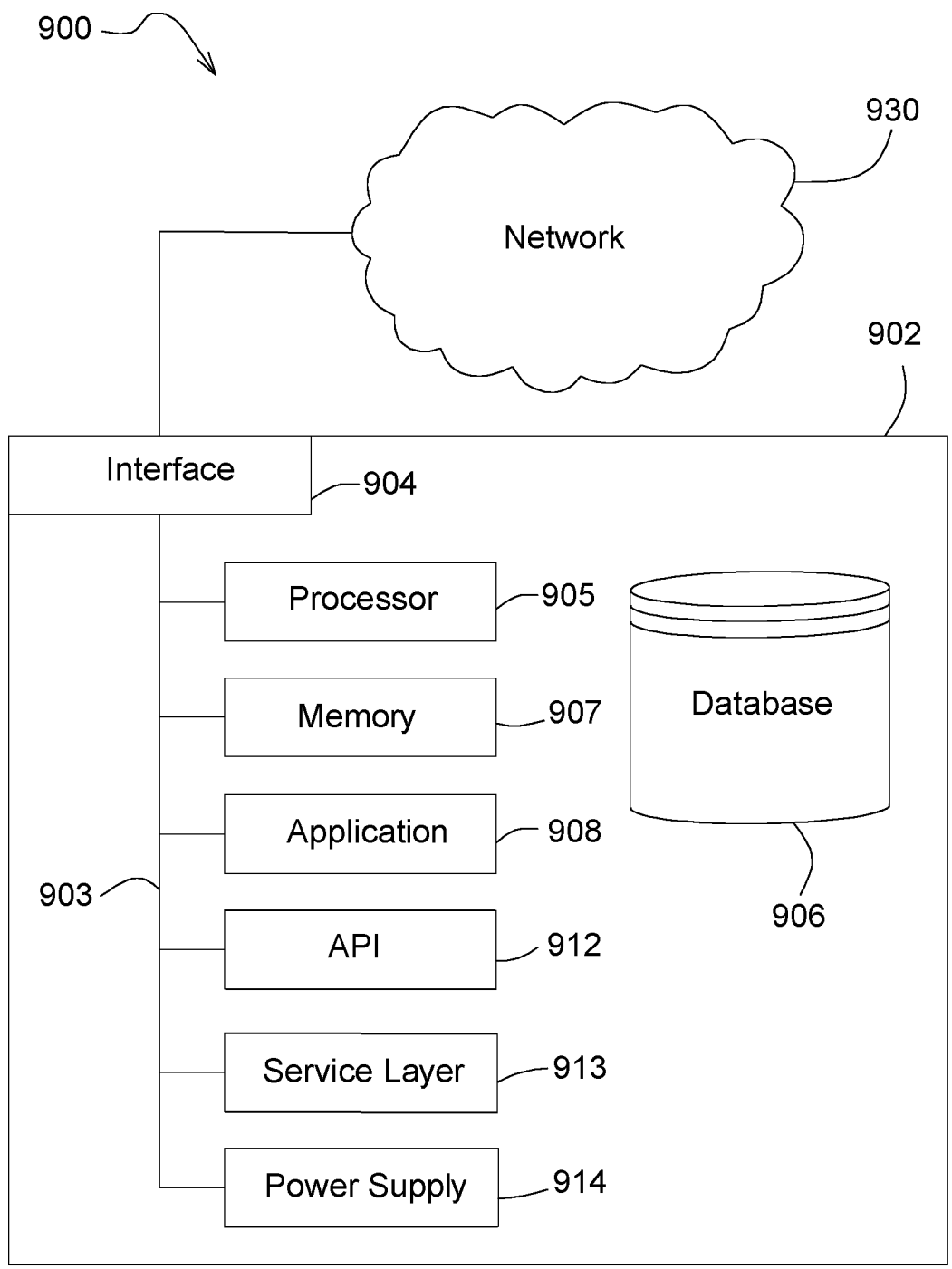
FIG. 9 is a block diagram illustrating an example computer system used to provide computational functionalities associated with described algorithms, methods, functions, processes, flows, and procedures as described in the present disclosure, according to some implementations of the present disclosure.

FIG. 9 is a block diagram of an example computer system 900 used to provide computational functionalities associated with described algorithms, methods, functions, processes, flows, and procedures described in the present disclosure, according to some implementations of the present disclosure. The illustrated computer 902 is intended to encompass any computing device such as a server, a desktop computer, a laptop/notebook computer, a wireless data port, a smart phone, a personal data assistant (PDA), a tablet computing device, or one or more processors within these devices, including physical instances, virtual instances, or both. The computer 902 can include input devices such as keypads, keyboards, and touch screens that can accept user information. Also, the computer 902 can include output devices that can convey information associated with the operation of the computer 902. The information can include digital data, visual data, audio information, or a combination of information. The information can be presented in a graphical user interface (UI) (or GUI).

The computer 902 can serve in a role as a client, a network component, a server, a database, a persistency, or components of a computer system for performing the subject matter described in the present disclosure. The illustrated computer 902 is communicably coupled with a network 930. In some implementations, one or more components of the computer 902 can be configured to operate within different environments, including cloud-computing-based environments, local environments, global environments, and combinations of environments.

At a high level, the computer 902 is an electronic computing device operable to receive, transmit, process, store, and manage data and information associated with the described subject matter. According to some implementations, the computer 902 can also include, or be communicably coupled with, an application server, an email server, a web server, a caching server, a streaming data server, or a combination of servers.

The computer 902 can receive requests over network 930 from a client application (for example, executing on another computer 902). The computer 902 can respond to the received requests by processing the received requests using software applications. Requests can also be sent to the computer 902 from internal users (for example, from a command console), external (or third) parties, automated applications, entities, individuals, systems, and computers.

Each of the components of the computer 902 can communicate using a system bus 903. In some implementations, any or all of the components of the computer 902, including hardware or software components, can interface with each other or the interface 904 (or a combination of both), over the system bus 903. Interfaces can use an application programming interface (API) 912, a service layer 913, or a combination of the API 912 and service layer 913. The API 912 can include specifications for routines, data structures, and object classes. The API 912 can be either computer-language independent or dependent. The API 912 can refer to a complete interface, a single function, or a set of APIs.

The service layer 913 can provide software services to the computer 902 and other components (whether illustrated or not) that are communicably coupled to the computer 902. The functionality of the computer 902 can be accessible for all service consumers using this service layer. Software services, such as those provided by the service layer 913, can provide reusable, defined functionalities through a defined interface. For example, the interface can be software written in JAVA, C++, or a language providing data in extensible markup language (XML) format. While illustrated as an integrated component of the computer 902, in alternative implementations, the API 912 or the service layer 913 can be stand-alone components in relation to other components of the computer 902 and other components communicably coupled to the computer 902. Moreover, any or all parts of the API 912 or the service layer 913 can be implemented as child or sub-modules of another software module, enterprise application, or hardware module without departing from the scope of the present disclosure.

The computer 902 includes an interface 904. Although illustrated as a single interface 904 in FIG. 9, two or more interfaces 904 can be used according to particular needs, desires, or particular implementations of the computer 902 and the described functionality. The interface 904 can be used by the computer 902 for communicating with other systems that are connected to the network 930 (whether illustrated or not) in a distributed environment. Generally, the interface 904 can include, or be implemented using, logic encoded in software or hardware (or a combination of software and hardware) operable to communicate with the network 930. More specifically, the interface 904 can include software supporting one or more communication protocols associated with communications. As such, the network 930 or the interface's hardware can be operable to communicate physical signals within and outside of the illustrated computer 902.

The computer 902 includes a processor 905. Although illustrated as a single processor 905 in FIG. 9, two or more processors 905 can be used according to particular needs, desires, or particular implementations of the computer 902 and the described functionality. Generally, the processor 905 can execute instructions and can manipulate data to perform the operations of the computer 902, including operations using algorithms, methods, functions, processes, flows, and procedures as described in the present disclosure.

The computer 902 also includes a database 906 that can hold data for the computer 902 and other components connected to the network 930 (whether illustrated or not). For example, database 906 can be an in-memory, conventional, or a database storing data consistent with the present disclosure. In some implementations, database 906 can be a combination of two or more different database types (for example, hybrid in-memory and conventional databases) according to particular needs, desires, or particular implementations of the computer 902 and the described functionality. Although illustrated as a single database 906 in FIG. 9, two or more databases (of the same, different, or combination of types) can be used according to particular needs, desires, or particular implementations of the computer 902 and the described functionality. While database 906 is illustrated as an internal component of the computer 902, in alternative implementations, database 906 can be external to the computer 902.

The computer 902 also includes a memory 907 that can hold data for the computer 902 or a combination of components connected to the network 930 (whether illustrated or not). Memory 907 can store any data consistent with the present disclosure. In some implementations, memory 907 can be a combination of two or more different types of memory (for example, a combination of semiconductor and magnetic storage) according to particular needs, desires, or particular implementations of the computer 902 and the described functionality. Although illustrated as a single memory 907 in FIG. 9, two or more memories 907 (of the same, different, or combination of types) can be used according to particular needs, desires, or particular implementations of the computer 902 and the described functionality. While memory 907 is illustrated as an internal component of the computer 902, in alternative implementations, memory 907 can be external to the computer 902.

The application 908 can be an algorithmic software engine providing functionality according to particular needs, desires, or particular implementations of the computer 902 and the described functionality. For example, application 908 can serve as one or more components, modules, or applications. Further, although illustrated as a single application 908, the application 908 can be implemented as multiple applications 908 on the computer 902. In addition, although illustrated as internal to the computer 902, in alternative implementations, the application 908 can be external to the computer 902.

The computer 902 can also include a power supply 914. The power supply 914 can include a rechargeable or non-rechargeable battery that can be configured to be either user- or non-user-replaceable. In some implementations, the power supply 914 can include power-conversion and management circuits, including recharging, standby, and power management functionalities. In some implementations, the power-supply 914 can include a power plug to allow the computer 902 to be plugged into a wall socket or a power source to, for example, power the computer 902 or recharge a rechargeable battery.

There can be any number of computers 902 associated with, or external to, a computer system containing computer 902, with each computer 902 communicating over network 930. Further, the terms "client," "user," and other appropriate terminology can be used interchangeably, as appropriate, without departing from the scope of the present disclosure. Moreover, the present disclosure contemplates that many users can use one computer 902 and one user can use multiple computers 902.

Described implementations of the subject matter can include one or more features, alone or in combination.

For example, in a first implementation, a computer-implemented method, including: lifting a body first portion of a vehicle relative to a frame second portion of the vehicle to a selected height with a first hydraulic fluid at pressure in excess of a first pressure; releasing the pressure in excess of the first pressure to cause the body first portion of the vehicle to fall relative to the frame second portion of the vehicle; establishing the hydraulic fluid at the first pressure when the body first portion has fallen by a selected amount; compressing a gas within a gas-charged hydraulic accumulator with the hydraulic fluid at the first pressure; causing the body first portion of the vehicle to rebound relative to the frame second portion of the vehicle in response to compression of the gas within the gas-charged hydraulic accumulator; and determining a nominal pre-charge gas pressure in the gas-charged hydraulic accumulator in response to the rebound of the first portion of the vehicle body relative to the frame second portion of the vehicle, the nominal pre-charge gas pressure being a gas pressure within the gas-charged hydraulic accumulator in the absence hydraulic pressure.

The foregoing and other described implementations can each, optionally, include one or more of the following features:

A first feature, combinable with any of the following features, wherein determining the pre-charge gas pressure in the gas-charged hydraulic accumulator in response to the rebound of the first portion of the vehicle relative to the second portion of the vehicle includes determining a distance that the first portion of the vehicle rebounds in response to the hydraulic pressure established at the first pressure.

A second feature, combinable with any of the previous or following features, wherein the distance that the first portion of the vehicle rebounds relative to the second portion of the vehicle is a change in length of an actuator coupled between the first portion of the vehicle and the second portion of the vehicle.

A third feature, combinable with any of the previous or following features, wherein determining the pre-charge gas pressure in the gas-charged hydraulic accumulator in response to the rebound of the first portion of the vehicle relative to the second portion of the vehicle includes determining the pre-charge gas pressure according to the relationship $$P_0(x, a) = \left(\frac{x}{a}\right) \cdot \left[\frac{n \cdot (F_{F1})^2}{V_o m}\right],$$

where $P_0$ is the pre-charge gas pressure within the gas-charged hydraulic accumulator; x is the distance that the first portion of the vehicle rebounds relative to the second portion of the vehicle; a is the acceleration of the first portion of the vehicle as the first portion of the vehicle falls relative to the second portion of the vehicle; n is a polytropic exponent of the gas contained in the gas-charged hydraulic accumulator; $F_{F1}$ is the static suspension force, i.e., a force used to maintain the first portion, such as body portion 102, in a vertically stationary position; $V_0$ is the internal volume of the gas-charged hydraulic accumulator; and m is the mass of the first portion or part of the first portion of the vehicle supported by $F_1$. For example, in some implementations, a part of the first portion of the vehicle, such as the body portion 102, may be supported by one or more axles of the vehicle. The remainder of the first portion corresponds to the mass, m, supported by $F_1$.

A fourth feature, combinable with any of the previous or following features, wherein lifting the first portion of the vehicle relative to the second portion of the vehicle to a selected height with hydraulic fluid at pressure in excess of a first pressure includes pivoting the first portion of the vehicle about a pivoting axis coupled to the second portion of the vehicle.

A fifth feature, combinable with any of the previous features, the method further including comparing the determined pre-charge gas pressure to a selected gas pressure; and altering a pressure of the gas within the gas-charged hydraulic accumulator when the determined pre-charge gas pressure varies by a selected amount from a selected gas pressure.

In a second implementation, a computer-implemented method, including: lifting, with a first hydraulic pressure greater than a selected hydraulic pressure, a first portion of the vehicle relative to a second portion of the vehicle to a selected height, the first portion of the vehicle coupled to the second portion of the vehicle; lowering, with a second hydraulic pressure greater than the selected hydraulic pressure, the first portion of the vehicle relative to the second portion of the vehicle; stopping the lowering of a first portion of the vehicle relative to the second portion when the first portion has been lowered by a selected amount; rebounding the first portion of the vehicle relative to the second portion of the vehicle with a gas-charged hydraulic actuator; sensing an amount of rebound of the first portion of the vehicle relative to the second portion; and determining a pre-charge gas pressure within the gas-charged hydraulic accumulator using the amount of rebound of the first portion of the vehicle relative to the second portion of the vehicle, the pre-charge gas pressure being a gas pressure within the gas-charged hydraulic accumulator in the absence of applied hydraulic pressure.

The foregoing and other described implementations can each, optionally, include one or more of the following features:

A first feature, combinable with any of the following features, wherein lifting, with the first hydraulic pressure greater than a selected hydraulic pressure, a first portion of the vehicle relative to a second portion of the vehicle to as selected height includes applying the first hydraulic pressure to a first end of a hydraulic actuator; and wherein lowering, with the second hydraulic pressure greater than the selected hydraulic pressure, the first portion of the vehicle relative to the second portion of the vehicle includes applying the second hydraulic pressure to a second end of the hydraulic actuator opposite the first end.

A second feature, combinable with any of the previous or following features, wherein the selected height is a maximum stroke of the hydraulic actuator.

A third feature, combinable with any of the previous or following features, wherein determining the pre-charge gas pressure within the gas-charged hydraulic accumulator using the amount of rebound of the first portion of the vehicle relative to the second portion of the vehicle includes determining the pre-charge gas pressure according to the relationship $$P_0(x, a) = \left(\frac{x}{a}\right) \cdot \left[\frac{n \cdot (F_{F1})^2}{V_o \cdot m}\right],$$

where $P_0$ is the pre-charge gas pressure within the gas-charged hydraulic accumulator; x is the distance that the first portion of the vehicle rebounds relative to the second portion of the vehicle; a is the acceleration of the first portion of the vehicle as the first portion of the vehicle lowers relative to the second portion of the vehicle; n is a polytropic exponent of the gas contained in the gas-charged hydraulic accumulator; $F_{F1}$ is the static suspension force, i.e., a force used to maintain the first portion, such as body portion 102, in a vertically stationary position; $V_0$ is the internal volume of the gas-charged hydraulic accumulator; and m is the mass of the first portion or part of the first portion of the vehicle supported by $F_{F1}$. For example, in some implementations, a part of the first portion of the vehicle, such as the body portion 102, may be supported by one or more axles of the vehicle. The remainder of the first portion corresponds to the mass, m, supported by $F_{F1}$.

A fourth feature, combinable with any of the previous or following features, wherein stopping the lowering of a first portion of the vehicle relative to the second portion when the first portion has been lowered by a selected amount includes pressurizing the hydraulic fluid at or above the selected hydraulic pressure.

A fifth feature, combinable with any of the previous or following features, wherein the first portion of the vehicle is pivotably coupled to the second portion of the vehicle.

A sixth feature, combinable with any of the previous or following features, wherein the first portion of the vehicle includes a body portion and wherein the second portion of the vehicle includes a frame portion.

A seventh feature, combinable with any of the previous or following features, wherein the first hydraulic pressure and the second hydraulic pressure are the same.

An eighth feature, combinable with any of the previous features, wherein the first hydraulic pressure and the second hydraulic pressure are different.

In a third implementation, a non-transitory, computer-readable medium storing one or more instructions executable by a computer system to perform operations including: lifting a body first portion of a vehicle relative to a frame second portion of the vehicle to a selected height with hydraulic fluid at pressure in excess of a first pressure; releasing the hydraulic pressure in excess of the first pressure to cause the body first portion of the vehicle to fall relative to the frame second portion of the vehicle; establishing the hydraulic fluid at the first pressure when the body first portion has fallen by a selected amount; compressing a gas within a gas-charged hydraulic accumulator with the hydraulic fluid at the first pressure; causing the body first portion of the vehicle to rebound relative to the frame second portion of the vehicle in response to compression of the gas within the gas-charged hydraulic accumulator; and determining a nominal pre-charge gas pressure in the gas-charged hydraulic accumulator in response to the rebound of the first portion of the vehicle body relative to the frame second portion of the vehicle, the nominal pre-charge gas pressure being a gas pressure within the gas-charged hydraulic accumulator in the absence hydraulic pressure.

The foregoing and other described implementations can each, optionally, include one or more of the following features:

A first feature, combinable with any of the following features, wherein determining the pre-charge gas pressure in the gas-charged hydraulic accumulator in response to the rebound of the first portion of the vehicle relative to the second portion of the vehicle includes determining a distance that the first portion of the vehicle rebounds in response to the hydraulic pressure established at the first pressure.

A second feature, combinable with any of the previous or following features, wherein the distance that the first portion of the vehicle rebounds relative to the second portion of the vehicle is a change in length of an actuator coupled between the first portion of the vehicle and the second portion of the vehicle.

A third feature, combinable with any of the previous or following features, wherein determining the pre-charge gas pressure in the gas-charged hydraulic accumulator in response to the rebound of the first portion of the vehicle relative to the second portion of the vehicle includes determining the pre-charge gas pressure according to the relationship $$P_0(x, a) = \left(\frac{x}{a}\right) \cdot \left[\frac{n \cdot (F_{F1})^2}{V_o \cdot m}\right],$$

where $P_0$ is the pre-charge gas pressure within the gas-charged hydraulic accumulator; x is the distance that the first portion of the vehicle rebounds relative to the second portion of the vehicle; a is the acceleration of the first portion of the vehicle as the first portion of the vehicle falls relative to the second portion of the vehicle; n is a polytropic exponent of the gas contained in the gas-charged hydraulic accumulator; $F_{F1}$ is the static suspension force, i.e., a force used to maintain the first portion, such as body portion 102, in a vertically stationary position; $V_0$ is the internal volume of the gas-charged hydraulic accumulator; and m is the mass of the first portion or part of the first portion of the vehicle supported by $F_{F1}$. For example, in some implementations, a part of the first portion of the vehicle, such as the body portion 102, may be supported by one or more axles of the vehicle. The remainder of the first portion corresponds to the mass, m, supported by $F_{F1}$.

A fourth feature, combinable with any of the previous or following features, wherein lifting the first portion of the vehicle relative to the second portion of the vehicle to a selected height with hydraulic fluid at pressure in excess of a first pressure includes pivoting the first portion of the vehicle about a pivoting axis coupled to the second portion of the vehicle.

A fifth feature, combinable with any of the previous features, the non-transitory, computer-readable medium further including instructions executable by a computer system to perform operations including comparing the determined pre-charge gas pressure to a selected gas pressure; and altering a pressure of the gas within the gas-charged hydraulic accumulator when the determined pre-charge gas pressure varies by a selected amount from a selected gas pressure.

In a fourth implementation, a computer-implemented system, including one or more processors and a non-transitory computer-readable storage medium coupled to the one or more processors and storing programming instructions for execution by the one or more processors, the programming instructions instructing the one or more processors to: lift a first portion of a vehicle relative to a second portion of the vehicle to a selected height with hydraulic fluid at pressure in excess of a first pressure; release the hydraulic pressure in excess of the first pressure to cause the first portion of the vehicle to fall relative to the second portion of the vehicle; establish the hydraulic fluid at the first pressure when the first portion has fallen by a selected amount; detect an amount of rebound of the first portion of the vehicle relative to the second portion as a result of compression of a gas within the gas-charged hydraulic accumulator in response to the hydraulic fluid established at the first pressure; and determine a pre-charge gas pressure in the gas-charged hydraulic accumulator based on the detected amount of rebound of the first portion of the vehicle relative to the second portion of the vehicle, the pre-charge gas pressure is a gas pressure within the gas-charged hydraulic accumulator in the absence of applied hydraulic pressure.

The foregoing and other described implementations can each, optionally, include one or more of the following features:

A first feature, combinable with any of the following features, wherein the programming instructions instructing the one or more processors to determine the pre-charge gas pressure in the gas-charged hydraulic accumulator in response to the rebound of the first portion of the vehicle relative to the second portion of the vehicle include programming instructions instructing the one or more processors to determine a distance that the first portion of the vehicle rebounds in response to the hydraulic pressure established at the first pressure.

A second feature, combinable with any of the previous or following features, wherein the programming instructions instructing the one or more processors to determine the pre-charge gas pressure in the gas-charged hydraulic accumulator in response to the rebound of the first portion of the vehicle relative to the second portion of the vehicle includes programming instructions instructing the one or more processors to determine a distance that the first portion of the vehicle rebounds in response to the hydraulic fluid established at the first pressure.

A third feature, combinable with any of the previous or following features, wherein the distance that the first portion of the vehicle rebounds relative to the second portion of the vehicle is a change in length of an actuator coupled between the first portion of the vehicle and the second portion of the vehicle.

A fourth feature, combinable with any of the previous or following features, wherein the programming instructions instructing the one or more processors to determine a pre-charge gas pressure in the gas-charged hydraulic accumulator in response to the rebound of the first portion of the vehicle relative to the second portion of the vehicle includes programming instructions instructing the one or more processors to determine the pre-charge gas pressure according to the relationship $$P_0(x, a) = \left(\frac{x}{a}\right) \cdot \left[\frac{n \cdot (F_{F1})^2}{V_o \cdot m}\right],$$

where $P_0$ is the pre-charge gas pressure within the gas-charged hydraulic accumulator; x is the distance that the first portion of the vehicle rebounds relative to the second portion of the vehicle; a is the acceleration of the first portion of the vehicle as the first portion of the vehicle falls relative to the second portion of the vehicle; n is a polytropic exponent of the gas contained in the gas-charged hydraulic accumulator; $F_{F1}$ is the static suspension force, i.e., a force used to maintain the first portion, such as body portion 102, in a vertically stationary position; $V_0$ is the internal volume of the gas-charged hydraulic accumulator; and m is the mass of the first portion or part of the first portion of the vehicle supported by $F_{F1}$. For example, in some implementations, a part of the first portion of the vehicle, such as the body portion 102, may be supported by one or more axles of the vehicle. The remainder of the first portion corresponds to the mass, m, supported by $F_{F1}$.

A fifth feature, combinable with any of the previous or following features, wherein the programming instructions instructing the one or more processors to lift the first portion of the vehicle relative to the second portion of the vehicle to a selected height with hydraulic fluid at pressure in excess of a first pressure includes programming instructions instructing the one or more processors to pivot the first portion of the vehicle about a pivoting axis coupled to the second portion of the vehicle.

A sixth feature, combinable with any of the previous or following features, further including programming instructions instructing one or more processors to: compare the determined pre-charge gas pressure to a selected gas pressure; and provide an indication when the determined pre-charge pressure of the gas within the gas-charged hydraulic accumulator varies by a selected amount from a selected gas pressure.

A seventh feature, combinable with any of the previous features, wherein the detected amount of rebound of the first portion of the vehicle relative to the second portion includes an amount of displacement of an actuator as the first portion of the vehicle to rebounds relative to the second portion of the vehicle.

Implementations of the subject matter and the functional operations described in this specification can be implemented in digital electronic circuitry, in tangibly embodied computer software or firmware, in computer hardware, including the structures disclosed in this specification and their structural equivalents, or in combinations of one or more of them. Software implementations of the described subject matter can be implemented as one or more computer programs. Each computer program can include one or more modules of computer program instructions encoded on a tangible, non-transitory, computer-readable computer-storage medium for execution by, or to control the operation of, data processing apparatus. Alternatively, or additionally, the program instructions can be encoded in/on an artificially generated propagated signal. The example, the signal can be a machine-generated electrical, optical, or electromagnetic signal that is generated to encode information for transmission to suitable receiver apparatus for execution by a data processing apparatus. The computer-storage medium can be a machine-readable storage device, a machine-readable storage substrate, a random or serial access memory device, or a combination of computer-storage mediums.

The terms "data processing apparatus," "computer," and "electronic computer device" (or equivalent as understood by one of ordinary skill in the art) refer to data processing hardware. For example, a data processing apparatus can encompass all kinds of apparatus, devices, and machines for processing data, including by way of example, a programmable processor, a computer, or multiple processors or computers. The apparatus can also include special purpose logic circuitry including, for example, a central processing unit (CPU), a field programmable gate array (FPGA), or an application-specific integrated circuit (ASIC). In some implementations, the data processing apparatus or special purpose logic circuitry (or a combination of the data processing apparatus or special purpose logic circuitry) can be hardware- or software-based (or a combination of both hardware- and software-based). The apparatus can optionally include code that creates an execution environment for computer programs, for example, code that constitutes processor firmware, a protocol stack, a database management system, an operating system, or a combination of execution environments. The present disclosure contemplates the use of data processing apparatuses with or without conventional operating systems, for example, LINUX, UNIX, WINDOWS, MAC OS, ANDROID, or IOS.

A computer program, which can also be referred to or described as a program, software, a software application, a module, a software module, a script, or code, can be written in any form of programming language. Programming languages can include, for example, compiled languages, interpreted languages, declarative languages, or procedural languages. Programs can be deployed in any form, including as stand-alone programs, modules, components, subroutines, or units for use in a computing environment. A computer program can, but need not, correspond to a file in a file system. A program can be stored in a portion of a file that holds other programs or data, for example, one or more scripts stored in a markup language document, in a single file dedicated to the program in question, or in multiple coordinated files storing one or more modules, sub-programs, or portions of code. A computer program can be deployed for execution on one computer or on multiple computers that are located, for example, at one site or distributed across multiple sites that are interconnected by a communication network. While portions of the programs illustrated in the various figures may be shown as individual modules that implement the various features and functionality through various objects, methods, or processes, the programs can instead include a number of sub-modules, third-party services, components, and libraries. Conversely, the features and functionality of various components can be combined into single components as appropriate. Thresholds used to make computational determinations can be statically, dynamically, or both statically and dynamically determined.

The methods, processes, or logic flows described in this specification can be performed by one or more programmable computers executing one or more computer programs to perform functions by operating on input data and generating output. The methods, processes, or logic flows can also be performed by, and apparatus can also be implemented as, special purpose logic circuitry, for example, a CPU, an FPGA, or an ASIC.

Computers suitable for the execution of a computer program can be based on one or more of general and special purpose microprocessors and other kinds of CPUs. The elements of a computer are a CPU for performing or executing instructions and one or more memory devices for storing instructions and data. Generally, a CPU can receive instructions and data from (and write data to) a memory. A computer can also include, or be operatively coupled to, one or more mass storage devices for storing data. In some implementations, a computer can receive data from, and transfer data to, the mass storage devices including, for example, magnetic, magneto-optical disks, or optical disks. Moreover, a computer can be embedded in another device, for example, a mobile telephone, a personal digital assistant (PDA), a mobile audio or video player, a game console, a global positioning system (GPS) receiver, or a portable storage device such as a universal serial bus (USB) flash drive.

Computer-readable media (transitory or non-transitory, as appropriate) suitable for storing computer program instructions and data can include all forms of permanent/non-permanent and volatile/non-volatile memory, media, and memory devices. Computer-readable media can include, for example, semiconductor memory devices such as random access memory (RAM), read-only memory (ROM), phase change memory (PRAM), static random access memory (SRAM), dynamic random access memory (DRAM), erasable programmable read-only memory (EPROM), electrically erasable programmable read-only memory (EEPROM), and flash memory devices. Computer-readable media can also include, for example, magnetic devices such as tape, cartridges, cassettes, and internal/removable disks. Computer-readable media can also include magneto-optical disks and optical memory devices and technologies including, for example, digital video disc (DVD), CD-ROM, DVD+/−R, DVD-RAM, DVD-ROM, HD-DVD, and BLU-RAY. The memory can store various objects or data, including caches, classes, frameworks, applications, modules, backup data, jobs, web pages, web page templates, data structures, database tables, repositories, and dynamic information. Types of objects and data stored in memory can include parameters, variables, algorithms, instructions, rules, constraints, and references. Additionally, the memory can include logs, policies, security or access data, and reporting files. The processor and the memory can be supplemented by, or incorporated in, special purpose logic circuitry.

Implementations of the subject matter described in the present disclosure can be implemented on a computer having a display device for providing interaction with a user, including displaying information to (and receiving input from) the user. Types of display devices can include, for example, a cathode ray tube (CRT), a liquid crystal display (LCD), a light-emitting diode (LED), and a plasma monitor. Display devices can include a keyboard and pointing devices including, for example, a mouse, a trackball, or a trackpad. User input can also be provided to the computer through the use of a touchscreen, such as a tablet computer surface with pressure sensitivity or a multi-touch screen using capacitive or electric sensing. Other kinds of devices can be used to provide for interaction with a user, including to receive user feedback including, for example, sensory feedback including visual feedback, auditory feedback, or tactile feedback. Input from the user can be received in the form of acoustic, speech, or tactile input. In addition, a computer can interact with a user by sending documents to, and receiving documents from, a device that is used by the user. For example, the computer can send web pages to a web browser on a user's client device in response to requests received from the web browser.

The term "graphical user interface," or "GUI," can be used in the singular or the plural to describe one or more graphical user interfaces and each of the displays of a particular graphical user interface. Therefore, a GUI can represent any graphical user interface, including, but not limited to, a web browser, a touch screen, or a command line interface (CLI) that processes information and efficiently presents the information results to the user. In general, a GUI can include a plurality of user interface (UI) elements, some or all associated with a web browser, such as interactive fields, pull-down lists, and buttons. These and other UI elements can be related to or represent the functions of the web browser.

Implementations of the subject matter described in this specification can be implemented in a computing system that includes a back-end component, for example, as a data server, or that includes a middleware component, for example, an application server. Moreover, the computing system can include a front-end component, for example, a client computer having one or both of a graphical user interface or a Web browser through which a user can interact with the computer. The components of the system can be interconnected by any form or medium of wireline or wireless digital data communication (or a combination of data communication) in a communication network. Examples of communication networks include a local area network (LAN), a radio access network (RAN), a metropolitan area network (MAN), a wide area network (WAN), Worldwide Interoperability for Microwave Access (WIMAX), a wireless local area network (WLAN) (for example, using 802.11 a/b/g/n or 802.20 or a combination of protocols), all or a portion of the Internet, or any other communication system or systems at one or more locations (or a combination of communication networks). The network can communicate with, for example, Internet Protocol (IP) packets, frame relay frames, asynchronous transfer mode (ATM) cells, voice, video, data, or a combination of communication types between network addresses.

The computing system can include clients and servers. A client and server can generally be remote from each other and can typically interact through a communication network. The relationship of client and server can arise by virtue of computer programs running on the respective computers and having a client-server relationship.

Cluster file systems can be any file system type accessible from multiple servers for read and update. Locking or consistency tracking may not be necessary since the locking of exchange file system can be done at application layer. Furthermore, Unicode data files can be different from non-Unicode data files.

While this specification contains many specific implementation details, these should not be construed as limitations on the scope of what may be claimed, but rather as descriptions of features that may be specific to particular implementations. Certain features that are described in this specification in the context of separate implementations can also be implemented, in combination, in a single implementation. Conversely, various features that are described in the context of a single implementation can also be implemented in multiple implementations, separately, or in any suitable sub-combination. Moreover, although previously described features may be described as acting in certain combinations and even initially claimed as such, one or more features from a claimed combination can, in some cases, be excised from the combination, and the claimed combination may be directed to a sub-combination or variation of a sub-combination.

Particular implementations of the subject matter have been described. Other implementations, alterations, and permutations of the described implementations are within the scope of the following claims as will be apparent to those skilled in the art. While operations are depicted in the drawings or claims in a particular order, this should not be understood as requiring that such operations be performed in the particular order shown or in sequential order, or that all illustrated operations be performed (some operations may be considered optional), to achieve desirable results. In certain circumstances, multitasking or parallel processing (or a combination of multitasking and parallel processing) may be advantageous and performed as deemed appropriate.

Moreover, the separation or integration of various system modules and components in the previously described implementations should not be understood as requiring such separation or integration in all implementations, and it should be understood that the described program components and systems can generally be integrated together in a single software product or packaged into multiple software products.

Accordingly, the previously described example implementations do not define or constrain the present disclosure. Other changes, substitutions, and alterations are also possible without departing from the spirit and scope of the present disclosure.

Furthermore, any claimed implementation is considered to be applicable to at least a computer-implemented method; a non-transitory, computer-readable medium storing computer-readable instructions to perform the computer-implemented method; and a computer system including a computer memory interoperably coupled with a hardware processor configured to perform the computer-implemented method or the instructions stored on the non-transitory, computer-readable medium.

While the above describes example implementations of the present disclosure, these descriptions should not be viewed in a limiting sense. Rather, other variations and modifications may be made without departing from the scope and spirit of the present disclosure as defined in the appended claims.

What is claimed is:

1. A method for detecting a pressure condition of a gas-charged hydraulic accumulator, the method comprising:
    lifting a first portion of a vehicle relative to a second portion of the vehicle to a selected height with hydraulic fluid at a pressure in excess of a first pressure;
    releasing the pressure in excess of the first pressure to cause the first portion of the vehicle to fall relative to the second portion of the vehicle;
    establishing the hydraulic fluid at the first pressure when the first portion has fallen by a selected amount;
    compressing a gas within a gas-charged hydraulic accumulator with the hydraulic fluid at the first pressure;
    causing the first portion of the vehicle to rebound relative to the second portion of the vehicle in response to compression of the gas within the gas-charged hydraulic accumulator; and
    determining a pre-charge gas pressure in the gas-charged hydraulic accumulator in response to the rebound of the first portion of the vehicle relative to the second portion of the vehicle, the pre-charge gas pressure being a gas pressure within the gas-charged hydraulic accumulator in the absence of hydraulic pressure.

2. The method of claim 1, wherein determining the pre-charge gas pressure in the gas-charged hydraulic accumulator in response to the rebound of the first portion of the vehicle relative to the second portion of the vehicle comprises determining a distance that the first portion of the vehicle rebounds in response to the hydraulic pressure established at the first pressure.

3. The method of claim 2, wherein the distance that the first portion of the vehicle rebounds relative to the second portion of the vehicle is a change in length of an actuator coupled between the first portion of the vehicle and the second portion of the vehicle.

4. The method of claim 1, wherein determining the pre-charge gas pressure in the gas-charged hydraulic accumulator in response to the rebound of the first portion of the vehicle relative to the second portion of the vehicle comprises determining the pre-charge gas pressure according to the relationship $$P_0(x,\ a) = \left(\frac{x}{a}\right) \cdot \left[\frac{n \cdot (F_{F1})^2}{V_o \cdot m}\right],$$

where $P_0$ is the pre-charge gas pressure within the gas-charged hydraulic accumulator; x is the distance that the first portion of the vehicle rebounds relative to the second portion of the vehicle; a is the acceleration of the first portion of the vehicle as the first portion of the vehicle falls relative to the second portion of the vehicle; n is a polytropic exponent of the gas contained in the gas-charged hydraulic accumulator; $F_{F1}$ is the static suspension force used to maintain the first portion in a vertically stationary position; $V_0$ is the internal volume of the gas-charged hydraulic accumulator; and m is the mass of the first portion of the vehicle or part of the first portion of the vehicle supported by $F_{F1}$.

5. The method of claim 1, wherein lifting the first portion of the vehicle relative to the second portion of the vehicle to a selected height with hydraulic fluid at a pressure in excess of a first pressure comprises pivoting the first portion of the vehicle about a pivoting axis coupled to the second portion of the vehicle.

6. The method of claim 1, further comprising:
comparing the determined pre-charge gas pressure to a selected gas pressure; and
altering a pressure of the gas within the gas-charged hydraulic accumulator when the determined pre-charge gas pressure varies by a selected amount from the selected gas pressure.

7. A method for detecting a pressure condition in a gas-charged hydraulic accumulator for a vehicle, the method comprising:
lifting, with a first hydraulic pressure greater than a selected hydraulic pressure, a first portion of the vehicle relative to a second portion of the vehicle to a selected height, the first portion of the vehicle coupled to the second portion of the vehicle;
lowering, with a second hydraulic pressure greater than the selected hydraulic pressure, the first portion of the vehicle relative to the second portion of the vehicle;
stopping the lowering of a first portion of the vehicle relative to the second portion when the first portion has been lowered by a selected amount;
rebounding the first portion of the vehicle relative to the second portion of the vehicle with a gas-charged hydraulic actuator;
sensing an amount of rebound of the first portion of the vehicle relative to the second portion; and
determining a pre-charge gas pressure within the gas-charged hydraulic accumulator using the amount of rebound of the first portion of the vehicle relative to the second portion of the vehicle, the pre-charge gas pressure being a gas pressure within the gas-charged hydraulic accumulator in the absence of applied hydraulic pressure.

8. The method of claim 7, wherein lifting, with a first hydraulic pressure greater than a selected hydraulic pressure, the first portion of the vehicle relative to a second portion of the vehicle to as selected height comprises applying the first hydraulic pressure to a first end of a hydraulic actuator; and
wherein lowering, with the second hydraulic pressure greater than the selected hydraulic pressure, the first portion of the vehicle relative to the second portion of the vehicle comprises applying the second hydraulic pressure to a second end of the hydraulic actuator opposite the first end.

9. The method of claim 8, wherein the selected height is a maximum stroke of the hydraulic actuator.

10. The method of claim 7, wherein determining the pre-charge gas pressure within the gas-charged hydraulic accumulator using the amount of rebound of the first portion of the vehicle relative to the second portion of the vehicle comprises determining the pre-charge gas pressure according to the relationship $$P_0(x, a) = \left(\frac{x}{a}\right) \cdot \left[\frac{n \cdot (F_{F1})^2}{V_o \cdot m}\right],$$

where $P_0$ is the pre-charge gas pressure within the gas-charged hydraulic accumulator; x is the distance that the first portion of the vehicle rebounds relative to the second portion of the vehicle; a is the acceleration of the first portion of the vehicle as the first portion of the vehicle lowers relative to the second portion of the vehicle; n is a polytropic exponent of the gas contained in the gas-charged hydraulic accumulator; $F_{F1}$ is the static suspension force used to maintain the first portion in a vertically stationary position; $V_0$ is the internal volume of the gas-charged hydraulic accumulator; and m is the mass of the first portion of the vehicle or part of the first portion of the vehicle supported by $F_{F1}$.

11. The method of claim 7, wherein stopping the lowering of a first portion of the vehicle relative to the second portion when the first portion has been lowered by a selected amount comprises pressurizing the hydraulic fluid at or above the selected hydraulic pressure.

12. The method of claim 7, wherein the first portion of the vehicle is pivotably coupled to the second portion of the vehicle.

13. The method of claim 7, wherein the first portion of the vehicle comprises a body portion and wherein the second portion of the vehicle comprises a frame portion.

14. The method of claim 7, wherein the first hydraulic pressure and the second hydraulic pressure are the same.

15. The method of claim 7, wherein the first hydraulic pressure and the second hydraulic pressure are different.

16. A computer-implemented system for determining a pre-charge gas pressure in a gas-charged hydraulic accumulator, the system comprising:
one or more processors; and
a non-transitory computer-readable storage medium coupled to the one or more processors and storing programming instructions for execution by the one or more processors, the programming instructions instructing the one or more processors to:
lift a first portion of a vehicle relative to a second portion of the vehicle to a selected height with hydraulic fluid at pressure in excess of a first pressure;
release the hydraulic pressure in excess of the first pressure to cause the first portion of the vehicle to fall relative to the second portion of the vehicle;
establish the hydraulic fluid at the first pressure when the first portion has fallen by a selected amount;
detect an amount of rebound of the first portion of the vehicle relative to the second portion as a result of compression of a gas within the gas-charged hydraulic accumulator in response to the hydraulic fluid established at the first pressure; and
determine a pre-charge gas pressure in the gas-charged hydraulic accumulator based on the detected amount of rebound of the first portion of the vehicle relative to the second portion of the vehicle, the pre-charge gas pressure being a gas pressure within the gas-charged hydraulic accumulator in the absence of applied hydraulic pressure.

17. The computer-implemented system of claim 16, wherein the programming instructions instructing the one or more processors to determine the pre-charge gas pressure in the gas-charged hydraulic accumulator in response to the rebound of the first portion of the vehicle relative to the second portion of the vehicle comprises programming instructions instructing the one or more processors to determine a distance that the first portion of the vehicle rebounds in response to the hydraulic fluid established at the first pressure.

18. The computer-implemented system of claim 17, wherein the distance that the first portion of the vehicle rebounds relative to the second portion of the vehicle is a change in length of an actuator coupled between the first portion of the vehicle and the second portion of the vehicle.

19. The computer-implemented system of claim 16, wherein the programming instructions instructing the one or more processors to determine a pre-charge gas pressure in the gas-charged hydraulic accumulator in response to the rebound of the first portion of the vehicle relative to the second portion of the vehicle comprises programming instructions instructing the one or more processors to determine the pre-charge gas pressure according to the relationship $$P_0(x, a) = \left(\frac{x}{a}\right) \cdot \left[\frac{n \cdot (F_{F1})^2}{V_o \cdot m}\right],$$

where $P_0$ is the pre-charge gas pressure within the gas-charged hydraulic accumulator; x is the distance that the first portion of the vehicle rebounds relative to the second portion of the vehicle; a is the acceleration of the first portion of the vehicle as the first portion of the vehicle falls relative to the second portion of the vehicle; n is a polytropic exponent of the gas contained in the gas-charged hydraulic accumulator; $F_{F1}$ is the static suspension force used to maintain the first portion in a vertically stationary position; $V_0$ is the internal volume of the gas-charged hydraulic accumulator; and m is the mass of the first portion of the vehicle of the vehicle or part of the first portion of the vehicle supported by $F_{F1}$.

20. The computer-implemented system of claim 16, wherein the programming instructions instructing the one or more processors to lift the first portion of the vehicle relative to the second portion of the vehicle to a selected height with hydraulic fluid at pressure in excess of a first pressure comprises programming instructions instructing the one or more processors to pivot the first portion of the vehicle about a pivoting axis coupled to the second portion of the vehicle.

21. The computer-implemented system of claim 16, further comprising programming instructions instructing one or more processors to:
  compare the determined pre-charge gas pressure to a selected gas pressure; and
  provide an indication when the determined pre-charge pressure of the gas within the gas-charged hydraulic accumulator varies by a selected amount from a selected gas pressure.

22. The computer-implemented system of claim 16, wherein the detected amount of rebound of the first portion of the vehicle relative to the second portion comprises an amount of displacement of an actuator as the first portion of the vehicle to rebounds relative to the second portion of the vehicle.

\* \* \* \* \*